US012707249B2

(12) United States Patent
Abedini et al.

(10) Patent No.: US 12,707,249 B2
(45) Date of Patent: Aug. 11, 2026

(54) COMMUNICATION PROCEDURE CONFIGURATION FOR MOBILE NETWORK NODES

(71) Applicant: QUALCOMM Incorporated, San Diego, CA (US)

(72) Inventors: Navid Abedini, Somerset, NJ (US); Jianghong Luo, Skillman, NJ (US); Karl Georg Hampel, Hoboken, NJ (US); Luca Blessent, Whitehouse Station, NJ (US); Tao Luo, San Diego, CA (US); Junyi Li, Chester, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/947,478

(22) Filed: Aug. 3, 2020

(65) Prior Publication Data

US 2021/0051557 A1 Feb. 18, 2021

Related U.S. Application Data

(60) Provisional application No. 62/886,725, filed on Aug. 14, 2019.

(51) Int. Cl.
*H04W 8/08* (2009.01)
*H04W 16/28* (2009.01)
(Continued)

(52) U.S. Cl.
CPC ............ *H04W 8/08* (2013.01); *H04W 16/28* (2013.01); *H04W 36/0058* (2018.08);
(Continued)

(58) Field of Classification Search
CPC .......... H04W 36/32; H04W 36/00835; H04W 36/0058; H04W 74/0808; H04W 74/0833;
(Continued)

(56) References Cited

U.S. PATENT DOCUMENTS

| | | | | |
|---|---|---|---|---|
| 9,681,323 | B2 | 6/2017 | Horn et al. | |
| 11,523,437 | B2 * | 12/2022 | Li | H04W 74/0833 |

(Continued)

FOREIGN PATENT DOCUMENTS

| | | | |
|---|---|---|---|
| CN | 109804669 | A | 5/2019 |
| WO | 2014179509 | A2 | 11/2014 |
| WO | 2018075534 | A1 | 4/2018 |

OTHER PUBLICATIONS

Taiwan Search Report—TW109126336—TIPO—Oct. 20, 2023.

(Continued)

*Primary Examiner* — Peter Chen
(74) *Attorney, Agent, or Firm* — Harrity & Harrity, LLP

(57) ABSTRACT

Various aspects of the present disclosure generally relate to wireless communication. In some aspects, a network node may determine a mobility state. The network node may determine a communication configuration, selected from a plurality of communication configurations associated with a plurality of mobility states, based at least in part on the mobility state. The network node may perform a communication procedure using the selected communication configuration. Numerous other aspects are provided.

48 Claims, 13 Drawing Sheets

(51) Int. Cl.

| | |
|---|---|
| ***H04W 36/00*** | (2009.01) |
| ***H04W 36/32*** | (2009.01) |
| ***H04W 48/16*** | (2009.01) |
| ***H04W 56/00*** | (2009.01) |
| ***H04W 74/0808*** | (2024.01) |
| ***H04W 74/0833*** | (2024.01) |
| ***H04W 88/14*** | (2009.01) |

(52) U.S. Cl.
CPC ......... *H04W 48/16* (2013.01); *H04W 56/001* (2013.01); *H04W 74/0808* (2013.01); *H04W 88/14* (2013.01); *H04W 36/324* (2023.05); *H04W 74/0833* (2013.01)

(58) Field of Classification Search
CPC ... H04W 72/042; H04W 76/27; H04W 16/28; H04W 56/001; H04W 48/16; H04W 48/18; H04W 8/08; H04W 8/22; H04W 88/085; H04W 88/14; H04B 7/0695; H04B 7/0617; H04B 7/15528
See application file for complete search history.

(56) References Cited

U.S. PATENT DOCUMENTS

| | | | | |
|---|---|---|---|---|
| 11,770,855 | B2 | 9/2023 | Ly et al. | |
| 2016/0057687 | A1 | 2/2016 | Horn et al. | |
| 2018/0084473 | A1* | 3/2018 | Nagaraja | H04W 36/0066 |
| 2018/0124820 | A1 | 5/2018 | Sun et al. | |
| 2018/0131434 | A1 | 5/2018 | Islam et al. | |
| 2019/0053193 | A1 | 2/2019 | Park et al. | |
| 2019/0053271 | A1 | 2/2019 | Islam et al. | |
| 2019/0158337 | A1* | 5/2019 | Yoon | H04L 27/2605 |
| 2019/0174554 | A1 | 6/2019 | Deenoo et al. | |
| 2019/0289516 | A1* | 9/2019 | Zhang | H04W 36/08 |
| 2019/0387440 | A1* | 12/2019 | Yiu | H04W 36/0072 |
| 2020/0053621 | A1* | 2/2020 | Reial | H04W 84/047 |
| 2020/0413453 | A1* | 12/2020 | Shao | H04L 5/0082 |
| 2021/0044412 | A1 | 2/2021 | Li et al. | |
| 2021/0044958 | A1 | 2/2021 | Abedini | |
| 2021/0259051 | A1* | 8/2021 | Latheef | H04W 40/22 |

OTHER PUBLICATIONS

ZTE: "Overview of Physical Layer Enhancements for IAB", 3GPP TSG RAN WG1 Meeting #93, R1-1806024, 3rd Generation Partnership Project, Mobile Competence Centre, 650, Route Des Lucioles, F-06921 Sophia-Antipolis Cedex, France, vol. RAN WG1, No. Busan, Korean, May 21, 2018-May 25, 2018, May 12, 2018, XP051462292, 9 Pages, sections 1-3, 4, pp. 1-3. 2 Multiplexing of Access/backhaul link pp. 3-5, 3 Frame structure design pp. 6-7, 4 SFI enhancement.

AT&T: "Overview of physical layer enhancements for IAB", 3GPP Draft; R1-1804662, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), XP051426930, 7 Pages, Retrieved from the Internet: URL:http://www.3gpp.org/ftp/Meetings%5F3GPP%5FSYNC/RAN1/Docs/ [retrieved on Apr. 15, 2018], section 2.1; pp. 2-3.

Nokia Siemens Networks, et al., "UE MSE and HetNet Mobility", 3GPP Draft; R2-120524, JV1SE and Hetnet Moblity, 3rd Generation Partnership Project (3GPP), Mobile Competence Centre, 650, Route Des Lucioles, F-06921 Sophia-Antipolis Cedex, France, vol. RAN WG2, Dresden, Germany, Feb. 6, 2012-Feb. 10, 2012, Jan. 31, 2012 (Jan. 31, 2012), XP050565427, 6 pages, [retrieved on Jan. 31, 2012].

Partial International Search Report—PCT/US2020/070360—ISA/EPO—Oct. 8, 2020.

International Search Report and Written Opinion—PCT/US2020/070360—ISAEPO—Nov. 13, 2020.

ZTE, et al., "Discussion on Enhancement of Initial Access Procedures for NR-U", 3GPP TSG RAN WG1 Meeting #96, R1-1901610, 3rd Generation Partnership Project (3GPP), Mobile Competence Centre, 650, Route Des Lucioles, F-06921 Sophia-Antipolis Cedex, vol. RAN WG1, No. Athens, Greece, Feb. 25, 2019-Mar. 1, 2019, Feb. 16, 2019, XP051599307, pp. 1-12, Proposal 9, p. 9, 3 Enhancement of 4-step random access procedure.

Qualcomm Incorporated: "Updated Proposal for RACH Extension for IAB", 3GPP Draft, R1-1905005, 7.2.3.2-Updated Proposal for RACH Extension for IAB, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051700120, 8 pages, Retrieved from the Internet: URL: http://www.3gpp.org/ftp/Meetings%5F3GPP%5FSYNC/RAN1/Docs/R1%2D1905005%2Ezip. [retrieved on Apr. 7, 2019] 3 Range of values of the scaling factor to increase RACH periodicity.

Taiwan Search Report—TW113130678—TIPO—Mar. 26, 2026.

* cited by examiner

800

900

COMMUNICATION PROCEDURE CONFIGURATION FOR MOBILE NETWORK NODES

CROSS-REFERENCE TO RELATED APPLICATION

This Patent Application claims priority to U.S. Provisional Patent Application No. 62/886,725, filed on Aug. 14, 2019, entitled "COMMUNICATION PROCEDURE CONFIGURATION FOR MOBILE NETWORK NODES," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for mobility state management.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a network node, may include determining a mobility state; determining a communication configuration, selected from a plurality of communication configurations associated with a plurality of mobility states, based at least in part on the mobility state; and performing a communication procedure using the selected communication configuration.

In some aspects, a method of wireless communication, performed by a network node, may include determining, for another network node, a mobility state; selecting a communication configuration from a plurality of communication configurations associated with a plurality of mobility states based at least in part on the mobility state; and causing, based at least in part on selecting the communication configuration, a communication procedure to be performed using the selected communication configuration.

In some aspects, a network node for wireless communication may include memory and one or more processors coupled to the memory. The memory and the one or more processors may be configured to determine a mobility state; determine a communication configuration, selected from a plurality of communication configurations associated with a plurality of mobility states, based at least in part on the mobility state; and perform a communication procedure using the selected communication configuration.

In some aspects, a network node for wireless communication may include memory and one or more processors coupled to the memory. The memory and the one or more processors may be configured to determine, for another network node, a mobility state; select a communication configuration from a plurality of communication configurations associated with a plurality of mobility states based at least in part on the mobility state; and cause, based at least in part on selecting the communication configuration, a communication procedure to be performed using the selected communication configuration.

In some aspects, a non-transitory computer-readable medium may store one or more instructions for wireless communication. The one or more instructions, when executed by one or more processors of a network node, may cause the one or more processors to determine a mobility state; determine a communication configuration, selected from a plurality of communication configurations associated with a plurality of mobility states, based at least in part on the mobility state; and perform a communication procedure using the selected communication configuration.

In some aspects, a non-transitory computer-readable medium may store one or more instructions for wireless communication. The one or more instructions, when executed by one or more processors of a network node, may cause the one or more processors to determine, for another network node, a mobility state; select a communication configuration from a plurality of communication configurations associated with a plurality of mobility states based at least in part on the mobility state; and cause, based at least in part on selecting the communication configuration, a communication procedure to be performed using the selected communication configuration.

In some aspects, an apparatus for wireless communication may include means for determining a mobility state; means for determining a communication configuration, selected from a plurality of communication configurations associated with a plurality of mobility states, based at least in part on the mobility state; and means for performing a communication procedure using the selected communication configuration.

In some aspects, an apparatus for wireless communication may include means for determining, for another network node, a mobility state; means for selecting a communication configuration from a plurality of communication configurations associated with a plurality of mobility states based at least in part on the mobility state; and means for causing, based at least in part on selecting the communication configuration, a communication procedure to be performed using the selected communication configuration.

In some aspects, a method of wireless communication performed by a network node includes receiving a synchronization signal block (SSB) burst associated with a set of random access channel (RACH) occasions (ROs); identifying an RO, of the set of ROs, that occurs within a RACH window; and transmitting a RACH message using the RO based at least in part on identifying the RO that occurs within the RACH window.

In some aspects, a network node for wireless communication includes: a memory; and one or more processors coupled to the memory, the memory and the one or more processors configured to receive an SSB burst associated with a set of ROs; identify an RO, of the set of ROs, that occurs within a RACH window; and transmit a RACH message using the RO based at least in part on identifying the RO that occurs within the RACH window.

In some aspects, a non-transitory computer-readable medium storing one or more instructions for wireless communication includes one or more instructions that, when executed by one or more processors of a network node, cause the one or more processors to receive a SSB burst associated with a set of ROs; identify an RO, of the set of ROs, that occurs within a RACH window; and transmit a RACH message using the RO based at least in part on identifying the RO that occurs within the RACH window.

In some aspects, an apparatus for wireless communication includes means for receiving a SSB burst associated with a set of ROs; means for identifying an RO, of the set of ROs, that occurs within a RACH window; and means for transmitting a RACH message using the RO based at least in part on identifying the RO that occurs within the RACH window.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
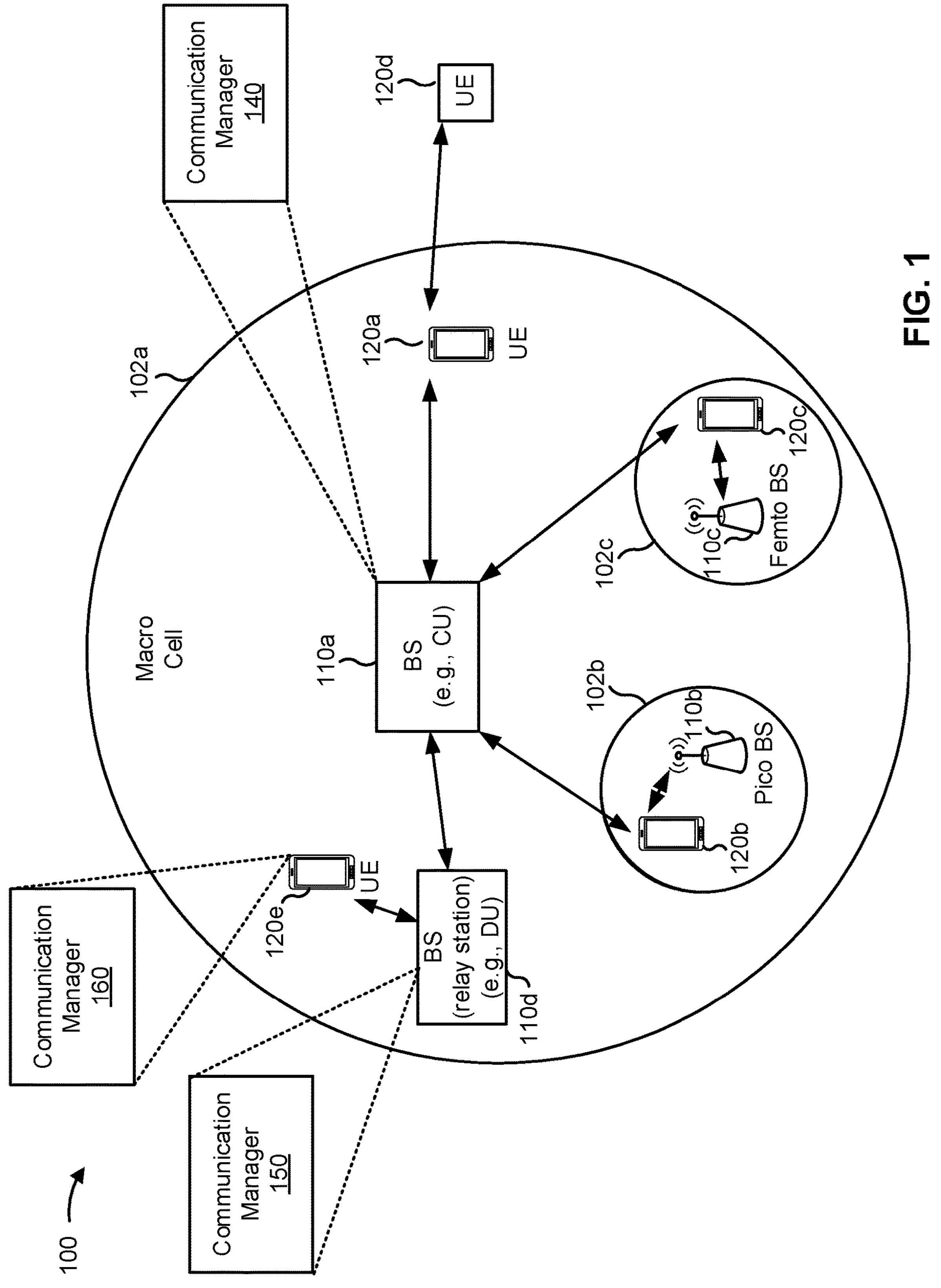
FIG. 1 is a block diagram conceptually illustrating an example of a wireless communication network, in accordance with various aspects of the present disclosure.

In some communications systems, such as 5G communications systems that use multi-hop networks (e.g., integrated access and backhauling (IAB)), a central unit (CU)—distributed unit (DU) architecture may be used. For example, an IAB-donor may be hierarchically connected to a set of IAB-nodes, a set of UEs, and/or the like. Each device in such a network may be referred to, generally, as a network node.

Different network nodes may be associated with different mobility states, which may correspond to different levels of mobility (e.g., different speeds at which a network node is traveling or is capable of traveling). For example, an IAB-donor network node may be configured as a stationary network node. In contrast, a UE may be a mobile network node associated with a particular level of mobility, such as a low level of mobility (e.g., movement at a relatively low speed, such as pedestrian-based movement), a medium level of mobility (e.g., movement at a relatively medium speed, such as automobile-based movement), or a high level of mobility (e.g., movement at a relatively high speed, such as high speed rail-based movement). An IAB-node may be associated with a stationary mobility state, a mobile mobility state (e.g., a low level, medium level, or high level of mobility), and/or the like.

Although some aspects are described in terms of particular types of mobility states (e.g., stationary, low mobility, medium mobility, high mobility, and/or the like), other types of mobility states are contemplated.

In some cases, a network node may change mobility states. For example, a UE may transition from a high level of mobility to a low level of mobility based at least in part on, for example, a user of the UE exiting a high speed rail transportation modality and continuing using a pedestrian transportation modality. Similarly, an IAB-node may transition from a mobile state to a stationary state when a speed of movement of the IAB-node is less than a threshold. For example, an IAB-node in an automobile may have a medium level of mobility while the automobile is moving and a stationary level of mobility when the automobile is parked. In this case, a threshold for distinguishing the medium level of mobility and the stationary level of mobility may be a single threshold at a particular speed, a plurality of thresholds (e.g., a first threshold for transitioning from medium to low levels of mobility and a second threshold for transitioning from low to stationary levels of mobility), and/or the like.

A network node may use a particular communication configuration for various communication procedures. For example, in an initial access procedure, a network node may transmit a set of beam-sweeping synchronization signal block (SSB) transmissions and/or a set of system information (e.g., remaining minimum system information (RMSI) transmissions). Similarly, in a random access channel (RACH) procedure, a network node may be configured to use periodic RACH occasions (e.g., which may correspond to SSB occasions for the SSB transmissions) to send and receive RACH messages. A network node may be configured with various different SSB periodicities, RMSI scanning periodicities, RACH occasion periodicities, and/or the like. A network node may determine a configuration from among the various periodicities, and may signal the configuration using a system information transmission.

A network node may also transmit and/or receive a set of reference signals in connection with the particular communication configuration. For example, the network node may periodically transmit and/or receive a beam-swept reference signal to perform a measurement. In this case, as an example, the network node may transmit a channel state information reference signal (CSI-RS) to perform a radio resource management (RRM) measurement, a radio link monitoring (RLM) measurement, and/or the like. Transmission and/or reception of the set of reference signals may be performed in accordance with one or more parameters, such as a beam-sweep periodicity, a beam quantity configuration, a beam width configuration, and/or the like.

However, the particular communication configuration may be statically defined for the network node. In mobility scenarios, as a result, the particular communication configuration may be poorly aligned to, for example, a reduced beam coherence at higher speeds. In this case, a network node configured statically for stationary deployments, that is traveling at a relatively high speed, may use a particular communication configuration that results in dropped communications as a result of reduced beam coherence at high speeds. Similarly, a network node configured statically for high-speed communication that is operating at low-speed or in a stationary mobility state, may fail to take advantage of increased beam coherence at low-speeds, resulting in poor utilization of network resources.

Some aspects described herein enable mobility state-based communication configuration. For example, a network node may determine a mobility state (e.g., of the network node, of another network node with which the network node is communicating, of another network node that the network node is controlling, and/or the like). In this case, the network node may select a communication configuration based at least in part on the mobility state. In this way, the network node enables performance of a communication procedure with an increased likelihood of a successful communication at high speeds and with an efficient utilization of network resources at low speeds.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms “eNB”, “base station”, “NR BS”, “gNB”, “TRP”, “AP”, “node B”, “5G NB”, and “cell” may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, a BS 110 (e.g., a central unit (CU), such as BS 110*a*) may include a communication manager 140. As described in more detail elsewhere herein, the communication manager 140 may determine, for another network node (e.g., BS 110*d*, UE 120*e*, and/or the like), a mobility state; select a communication configuration from a plurality of communication configurations associated with a plurality of mobility states based at least in part on the mobility state; and cause, based at least in part on selecting the communication configuration, a communication procedure to be performed using the selected communication configuration. Additionally, or alternatively, the communication manager 150 may perform one or more other operations described herein.

Similarly, a BS 110 (e.g., a distributed unit (DU), such as BS 110*d*) may include a communication manager 150. As described in more detail elsewhere herein, the communication manager 150 may determine a mobility state; determine a communication configuration, selected from a plurality of communication configurations associated with a plurality of mobility states, based at least in part on the mobility state; and perform a communication procedure using the selected communication configuration. Additionally, or alternatively, the communication manager 150 may perform one or more other operations described herein.

Similarly, a UE 120 (e.g., UE 120*e*) may include a communication manager 160. As described in more detail elsewhere herein, the communication manager 160 may determine a mobility state; determine a communication configuration, selected from a plurality of communication configurations associated with a plurality of mobility states, based at least in part on the mobility state; and perform a communication procedure using the selected communication configuration. Additionally, or alternatively, the communication manager 160 may perform one or more other operations described herein.

As indicated above, FIG. 1 is provided merely as an example. Other examples may differ from what is described with regard to FIG. 1.

Figure 2:
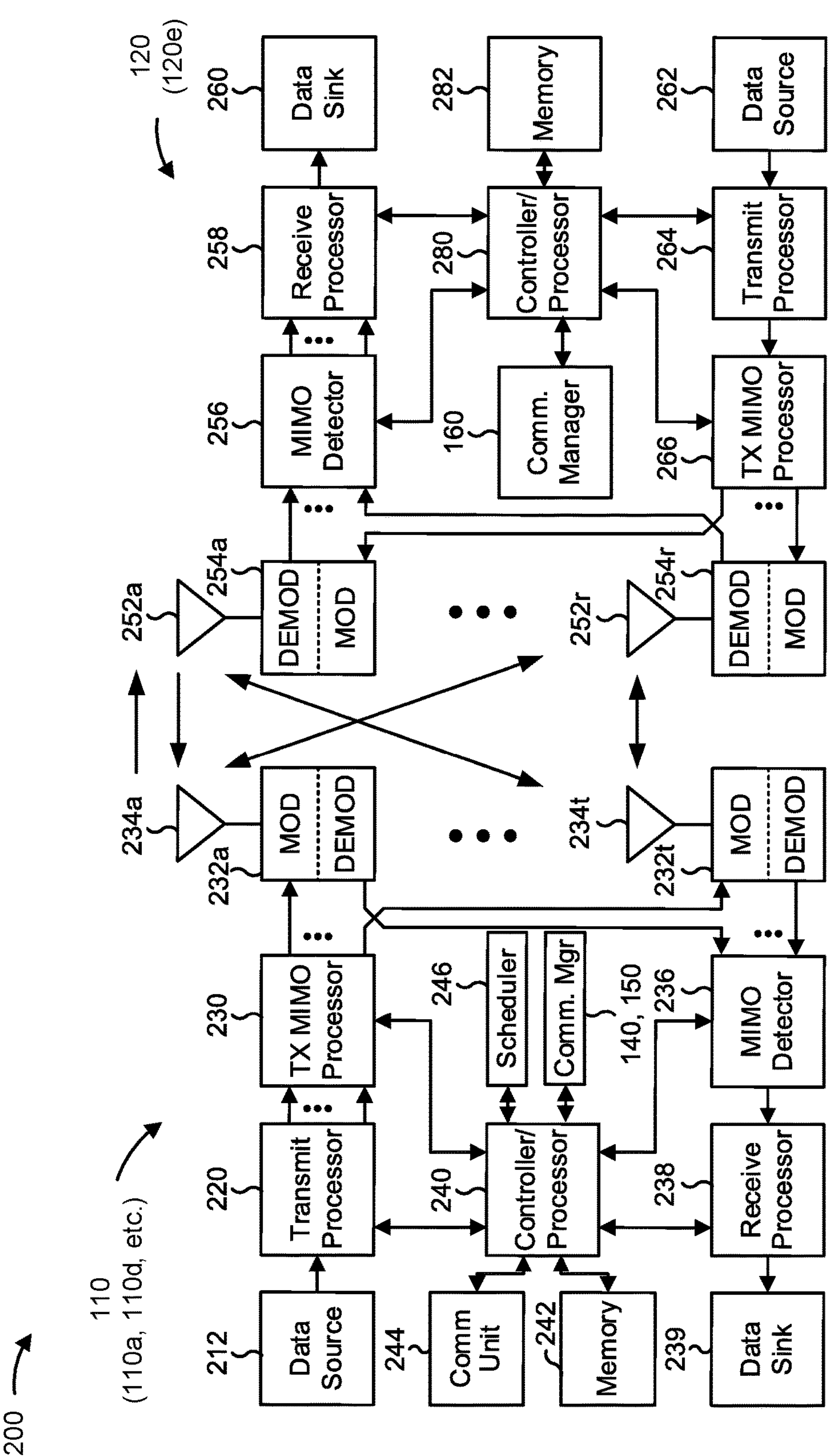
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may provide means for transmitting data or control information, among other examples, to, for example, UE 120. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The controller/processor 280 may provide, for UE 120, means for determining, identifying, or selecting, among other examples, such as using a determination circuit, an identification circuit, a selection circuit, and/or the like. The receive processor 258 may provide, for UE 120, means for receiving data or control information, among other examples, from, for example, BS 110. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. The transmit processor 264 may provide, for UE 120, means for transmitting data or control information, among other examples, to, for example, BS 110. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide, for BS 110, means for receiving data or control information, among other examples, from, for example, UE 120. Receive processor 238 may provide the decoded data to a data sink 239 and the decoded control information to controller/processor 240. The controller/processor 240 may provide means for, for example, determining, selecting, identifying, or detecting, among other examples. Base station 110 may include communication unit 244.

Controller/processor 240 of base station 110, controller/processor 280 of UE 120, and/or any other component(s) of FIG. 2 may perform one or more techniques associated with communication procedure configuration for mobile network nodes, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for determining a mobility state (e.g., using controller/processor 280), means for determining a communication configuration, selected from a plurality of communication configurations associated with a plurality of mobility states, based at least in part on the mobility state (e.g., using controller/processor 280), means for performing a communication procedure using the selected communication configuration (e.g., using transmit processor 264, receive processor 258, among other examples), and/or the like. Additionally, or alternatively, the UE 120 may include means for performing one or more other operations described herein. In some aspects, such means may include the communication manager 160. Additionally, or alternatively, such means may include one or more components of the UE 120 described in connection with FIG. 2.

In some aspects, the base station 110 may include means for determining a mobility state (e.g., using controller/processor 240), means for determining a communication configuration, selected from a plurality of communication configurations associated with a plurality of mobility states, based at least in part on the mobility state (e.g., using controller/processor 240), means for performing a communication procedure using the selected communication configuration (e.g., using transmit processor 220, controller/processor 240, receiver processor 238, among other examples), and/or the like. Additionally, or alternatively, the base station 110 may include means for performing one or more other operations described herein. In some aspects, such means may include the communication manager 150. In some aspects, such means may include one or more components of the base station 110 described in connection with FIG. 2.

In some aspects, the base station 110 may include means for determining, for another network node, a mobility state (e.g., using controller/processor 240), means for selecting a communication configuration from a plurality of communication configurations associated with a plurality of mobility states based at least in part on the mobility state (e.g., using controller/processor 240), means for causing, based at least in part on selecting the communication configuration, a communication procedure to be performed using the selected communication configuration (e.g., using controller/processor 240, transmit processor 220, receive processor 238, among other examples), and/or the like. Additionally, or alternatively, the base station 110 may include means for performing one or more other operations described herein. In some aspects, such means may include the communication manager 140. In some aspects, such means may include one or more components of the base station 110 described in connection with FIG. 2.

In some aspects, the UE 120 may include means for determining a mobility state, means for receiving a synchronization signal block (SSB) burst associated with a set of random access channel (RACH) occasions (ROs); means for identifying an RO, of the set of ROs, that occurs within a RACH window; means for transmitting a RACH message using the RO based at least in part on identifying the RO that occurs within the RACH window; and/or the like. In some aspects, such means may include the communication manager 160. Additionally, or alternatively, such means may include one or more components of the UE 120 described in connection with FIG. 2.

As indicated above, FIG. 2 is provided merely as an example. Other examples may differ from what is described with regard to FIG. 2.

Figure 3A:
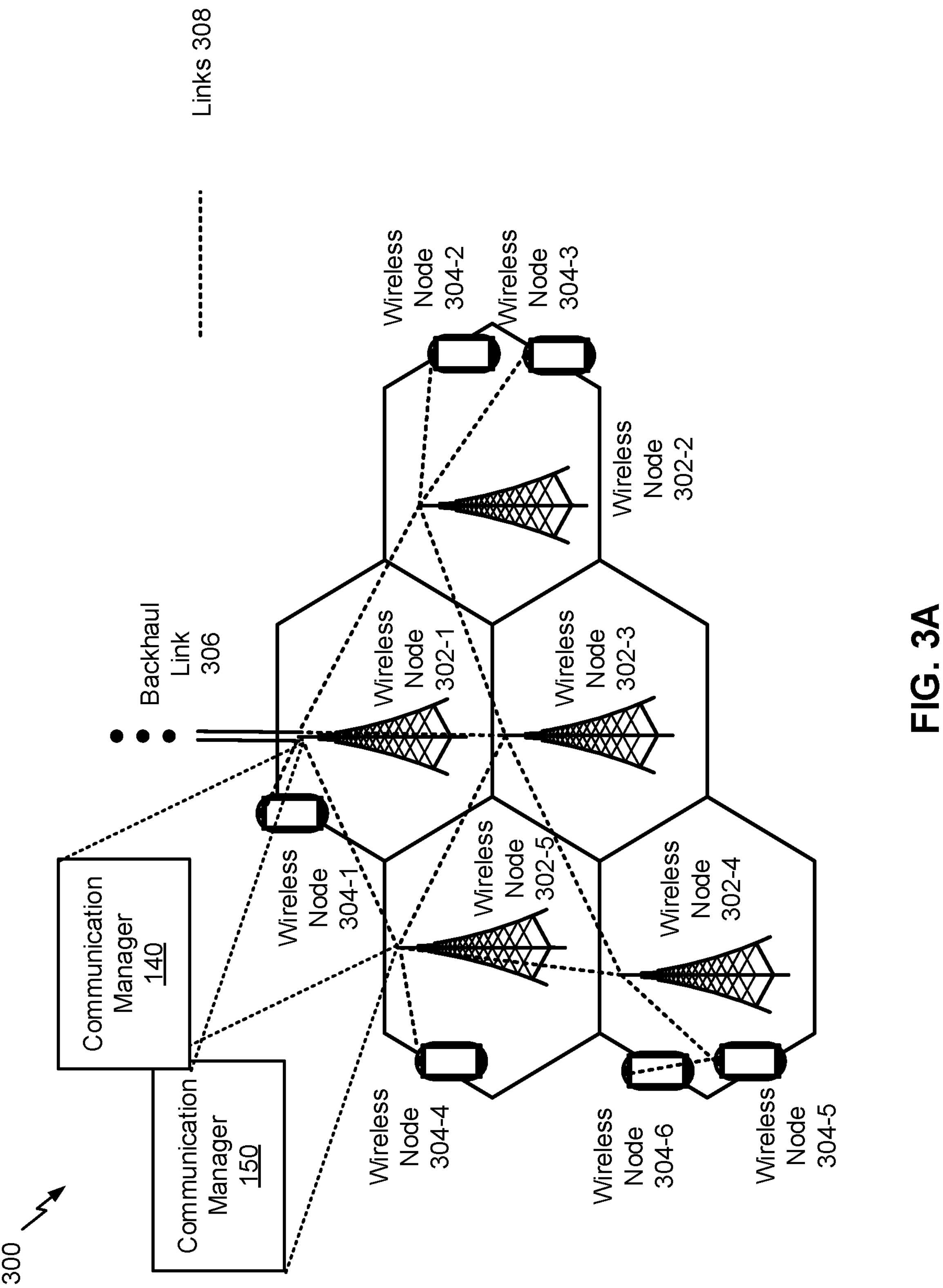
FIGS. 3A and 3B are diagrams illustrating an example of a network topology for a multi-hop network, in accordance with various aspects of the present disclosure.
Figure 3B:
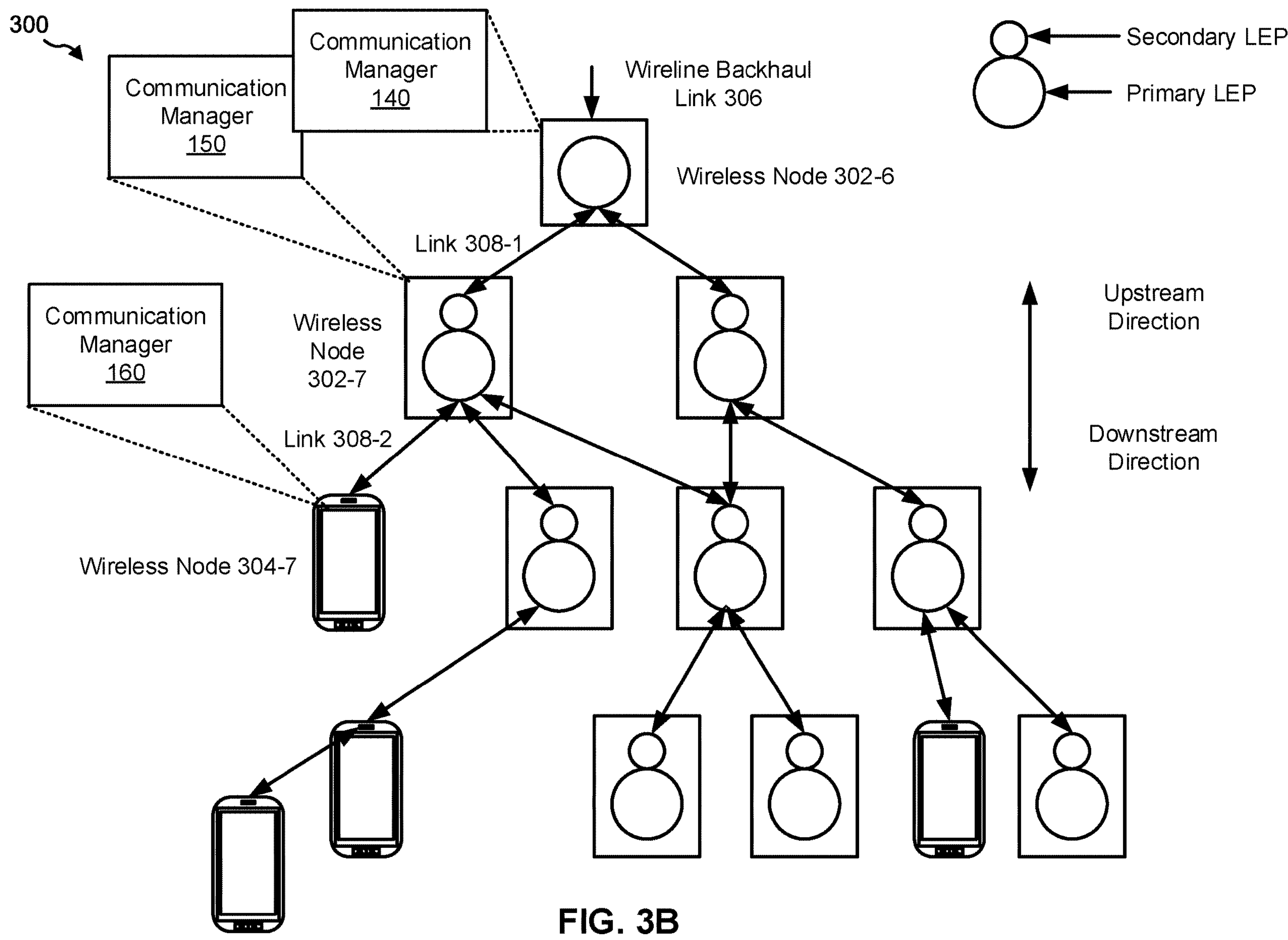

FIGS. 3A and 3B are diagrams illustrating an example 300 of a network topology for a network, in accordance with various aspects of the present disclosure. Self-backhauling or integrated access/backhaul (IAB) may be deployed to use a common set of resources for access traffic and backhaul traffic. For example, a first wireless node (e.g., BS 110*a*, BS 110*d*, and/or the like) may communicate backhaul traffic with a second wireless node and may communicate access traffic with a third wireless node. Although some aspects described herein are described in terms of an IAB deployment, some aspects described herein may be used in connection with other types of multi-hop networks.

As shown in FIG. 3A, example 300 may include multiple wireless nodes 302 (e.g., BSs) and multiple wireless nodes 304 (e.g., UEs). At least one wireless node (e.g., wireless node 302-1, which may be a CU, such as BS 110*a*) may communicate with a core network via a backhaul link 306, such as a fiber connection, a wireless backhaul connection, a combination thereof, and/or the like. Wireless nodes 302 and 304 may communicate with each other using a set of links 308, such as a set of mmWave links; a 3G, 4G, 5G, etc. air interface; any future wireless network (e.g., a 6G wireless network); and/or the like. The wireless nodes 302, which may be network nodes, may be associated with different mobility states, such as stationary mobility states, mobile mobility states (e.g., a high level of mobility, a low level of mobility, etc.), and/or the like.

As further shown in FIG. 3A, one or more wireless nodes 302 or 304 may communicate indirectly via one or more other wireless nodes 302 or 304. For example, data may be transferred from a core network to wireless node 304-4 via backhaul link 306, a link 308 between wireless node 302-1 (e.g., BS 110*a*) and wireless node 302-5 (e.g., which may be a DU, such as BS 110*d*), and a link 308 between wireless node 302-5 and wireless node 304-4 (e.g., which may be a UE, such as UE 120*e*).

As shown in FIG. 3B, wireless nodes 302 and wireless nodes 304 can be arranged in a hierarchical topology to enable management of network resources. Each link 308 may be associated with a primary link end point (primary LEP, which may also be referred to as a served LEP, a controlling/controller LEP, a principal LEP, a main LEP, a managing LEP, an administering LEP, and/or the like) and a secondary link end point (secondary LEP, which may also be referred to as a serving LEP, a controlled/controlee LEP, a subordinate LEP, a subsidiary LEP, a managed LEP, an administered LEP, and/or the like), which may define a hierarchy between wireless nodes 302 or 304. For example, a wireless node 302-6 (e.g., which may be a CU, such as BS 110*a*) may communicate with a wireless node 302-7 (e.g., which may be a DU, such as BS 110*d*, that is a child node or inferior node of wireless node 302-6) via link 308-1, which may be a parent link for wireless node 302-7. In this case, wireless node 302-6 may provide configuration information, such as a communication configuration, a rule for determining a communication configuration, and/or the like. Additionally, or alternatively, wireless node 302-6 may provide, to wireless node 302-7, information regarding a mobility state of a child node of wireless node 302-7 (e.g., based at least in part on mobility information received from a core network). Similarly, wireless node 302-7 may communicate with wireless node 304-7 (e.g., which may be a UE, such as UE 120*e*, which may be a child node or inferior node of wireless node 302-7) via link 308-2, which may be a child link for wireless node 302-7. In this case, wireless node 302-6 may schedule for wireless node 302-7, which may schedule for wireless node 304-7 based at least in part on the hierarchy defined herein.

As indicated above, FIGS. 3A and 3B are provided as examples. Other examples are possible and may differ from what was described with respect to FIGS. 3A and 3B.

Figure 4:
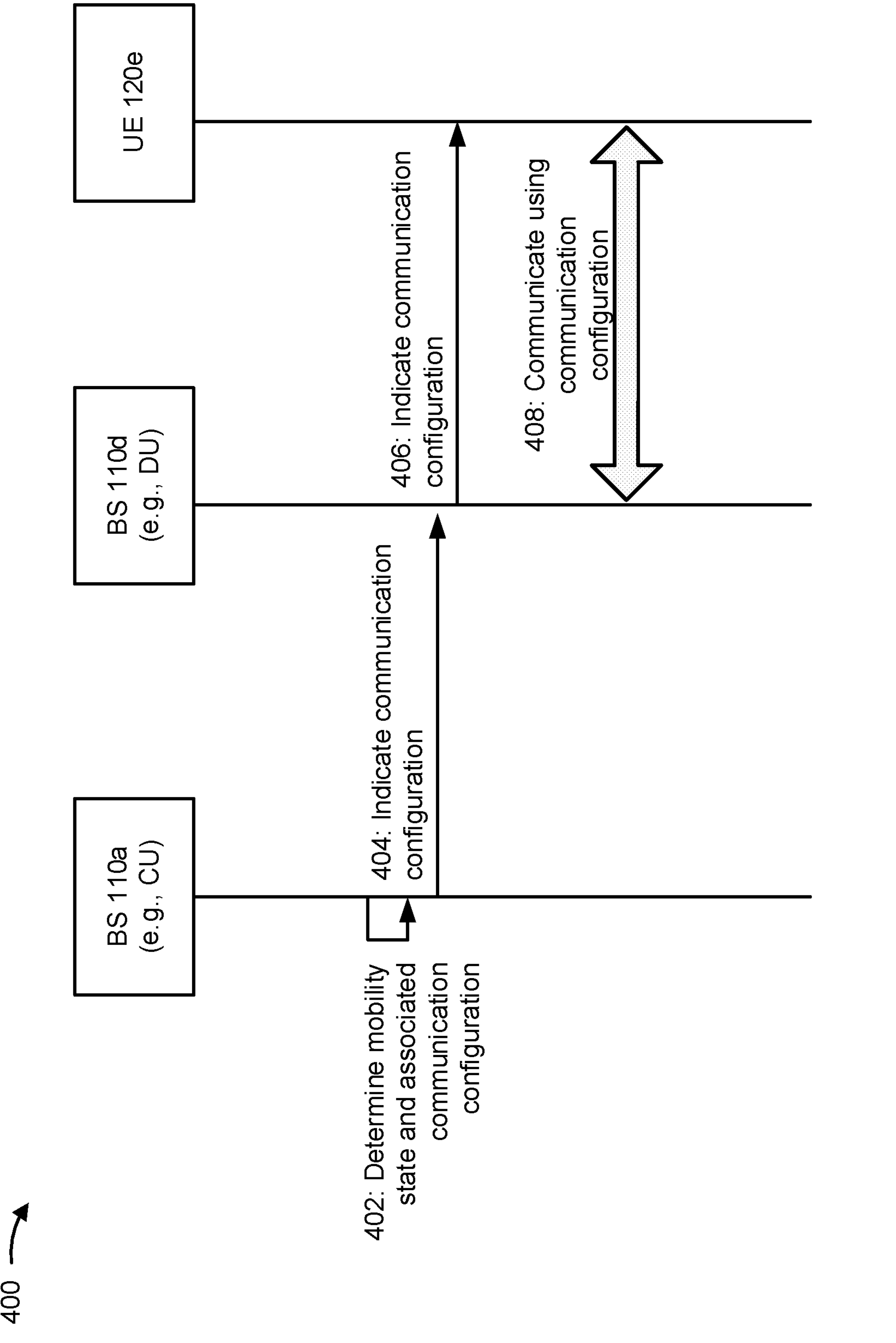
FIGS. 4 and 5 are diagrams illustrating examples of communication procedure configuration for mobile network nodes, in accordance with various aspects of the present disclosure.

FIG. 4 is a diagram illustrating an example 400 of communication procedure configuration for mobile network nodes, in accordance with various aspects of the present disclosure. As shown in FIG. 4, example 400 includes a BS 110*a* (e.g., a CU), a BS 110*d* (e.g., a DU), and a UE 120*e*.

As shown in FIG. 4, and by reference number 402, BS 110*a* may determine a mobility state and an associated communication configuration. For example, BS 110*a* may select the communication configuration from a plurality of communication configurations corresponding to a plurality of mobility states. In this case, BS 110*a* may select a communication configuration for a stationary mobility state, a high speed mobility state, a medium speed mobility state, a low speed mobility state, and/or the like. In some aspects, BS 110*a* may determine the mobility state based at least in part on received signaling. For example, BS 110*a* may receive signaling from BS 110*d* and/or UE 120*e* indicating a mobility state of BS 110*d* and/or UE 120*e*. Additionally, or alternatively, BS 110*a* may receive signaling from a core network device identifying a mobility state of BS 110*d* and/or UE 120*e*.

In some aspects, BS 110*a* may select the communication configuration based at least in part on a particular configured rule. For example, BS 110*a* may determine that a particular mobility state corresponds to a particular communication configuration or a particular set of parameters thereof. In some aspects, each communication configuration may be associated with a single other mobility state. In this case, based at least in part on determining a particular mobility state, BS 110*a* may determine a particular communication configuration that corresponds to the particular mobility state. In some aspects, each communication configuration may be associated with a set of mobility states. For example, BS 110*a* may select a first communication configuration for both a first mobility state and a second mobility state (e.g., a high speed mobility state and a medium speed mobility state) and may select a second communication configuration for both a third mobility state and a fourth mobility state (e.g., a low speed mobility state and a stationary mobility state). In some aspects, each mobility state may be associated with a plurality of different communication configurations. In this case, BS 110*a* may select a communication configuration based at least in part on a mobility state and one or more other factors, such as a communication configuration selection rule, a capability of UE 120*e*, and/or the like, which may enable BS 110*a* to select from a plurality of possible communication configurations for a particular mobility state of UE 120*e*.

In some aspects, BS 110*a* may signal the particular configured rule to, for example, BS 110*d* and/or UE 120*e* to enable BS 110*d* and/or UE 120*e* to select the particular communication configuration (e.g., without explicit signaling from BS 110*a* identifying the particular communication configuration).

In some aspects, BS 110*a* may select a communication configuration for a particular communication procedure. For example, BS 110*a* may select the communication configuration for an initial access procedure, a cell reselection procedure, a neighbor-cell search procedure, a peer discovery procedure, or a measurement procedure. In some aspects, BS 110*a* may select a communication configuration with a particular set of parameters. For example, for a high speed mobility state, BS 110*a* may select a communication configuration associated with a more frequent transmission of beam-sweeping reference signals and system information (e.g., SSBs, CSI-RSs, RMSIs, and/or the like) relative to a communication configuration for a low speed mobility state. In this way, by using a faster periodicity (e.g., a transmission periodicity of, for example, 5 milliseconds (ms) or 10 ms), BS 110*a* enables improved communication at reduced levels of beam coherence associated with high speed travel.

Additionally, or alternatively, BS 110*a* may select a communication configuration with a more frequent RACH occasion for a high speed mobility state relative to a communication configuration for a lower speed mobility state. In this way, BS 110*a* may reduce a time gap between SSBs and corresponding RACH occasions, thereby improving communications for high speed travel. Additionally, or alternatively, BS 110*a* may select a communication configuration with wider beams for a high speed mobility state relative to a communication configuration for a lower speed mobility state. In this way, BS 110*a* enables communication using beams with a longer coherence time, thereby accounting for reduced beam coherence at higher speeds.

In contrast, for a lower speed mobility state, BS 110*a* may select a communication configuration with a narrower beam, which may provide improved communication using a beam with a greater level of beamforming gain. In some aspects, BS 110*a* may select a communication configuration with different beam widths for different types of transmissions. For example, BS 110*a* may enable communication using a relatively wide beam for SSB transmission and a relatively narrow beam for RACH transmission, thereby optimizing communication for different types of transmission. In this case, the communication configuration may include a one-to-many mapping between SSB transmissions and RACH occasions.

In some aspects, BS 110*a* may select a communication configuration with a RACH messaging window defined for high mobility states when BS 110*d* and/or UE 120 are in a high mobility state. For example, BS 110*a* may configure a RACH message type 1 (MSG1) window where RACH occasions are within a threshold time separation of associated SSB locations. This may reduce a likelihood of UE 120*e* detecting an SSB burst in a first time location and not using a next occurring RACH occasion for a RACH transmission (and using a later occurring RACH occasion for the RACH transmission). By avoiding UE 120*e* transmitting a RACH MSG1 in a later occurring RACH occasion, BS 110*a* may improve communication in high mobility states.

As further shown in FIG. 4, and by reference number 404, BS 110*a* may indicate the communication configuration to BS 110*d*. For example, BS 110*a* may transmit a message to BS 110*d* indicating that BS 110*d* is to use a particular communication configuration explicitly identified by the message. Additionally, or alternatively, BS 110*a* may transmit an indication of a mobility state (e.g., of UE 120*e*), which may enable BS 110*d* to select a communication configuration that is associated with the mobility state.

As further shown in FIG. 4, and by reference number 406, BS 110*d* may indicate the communication configuration to UE 120*e*. Additionally, or alternatively, BS 110*a* may indicate the communication configuration to UE 120*e*. For example, when BS 110*a* is a control network node that controls both BS 110*d* and UE 120*e*, BS 110*a* may transmit an indication of the communication configuration directly to UE 120*e*.

As further shown in FIG. 4, and by reference number 408, BS 110*d* and UE 120*e* may communicate using the communication configuration. For example, BS 110*d* and UE 120*e* may communicate in accordance with the communication configuration to perform an initial access procedure, a cell reselection procedure, a neighbor-cell search procedure, a peer discovery procedure, or a measurement procedure.

As indicated above, FIG. 4 is provided as an example. Other examples may differ from what is described with respect to FIG. 4.

Figure 5:
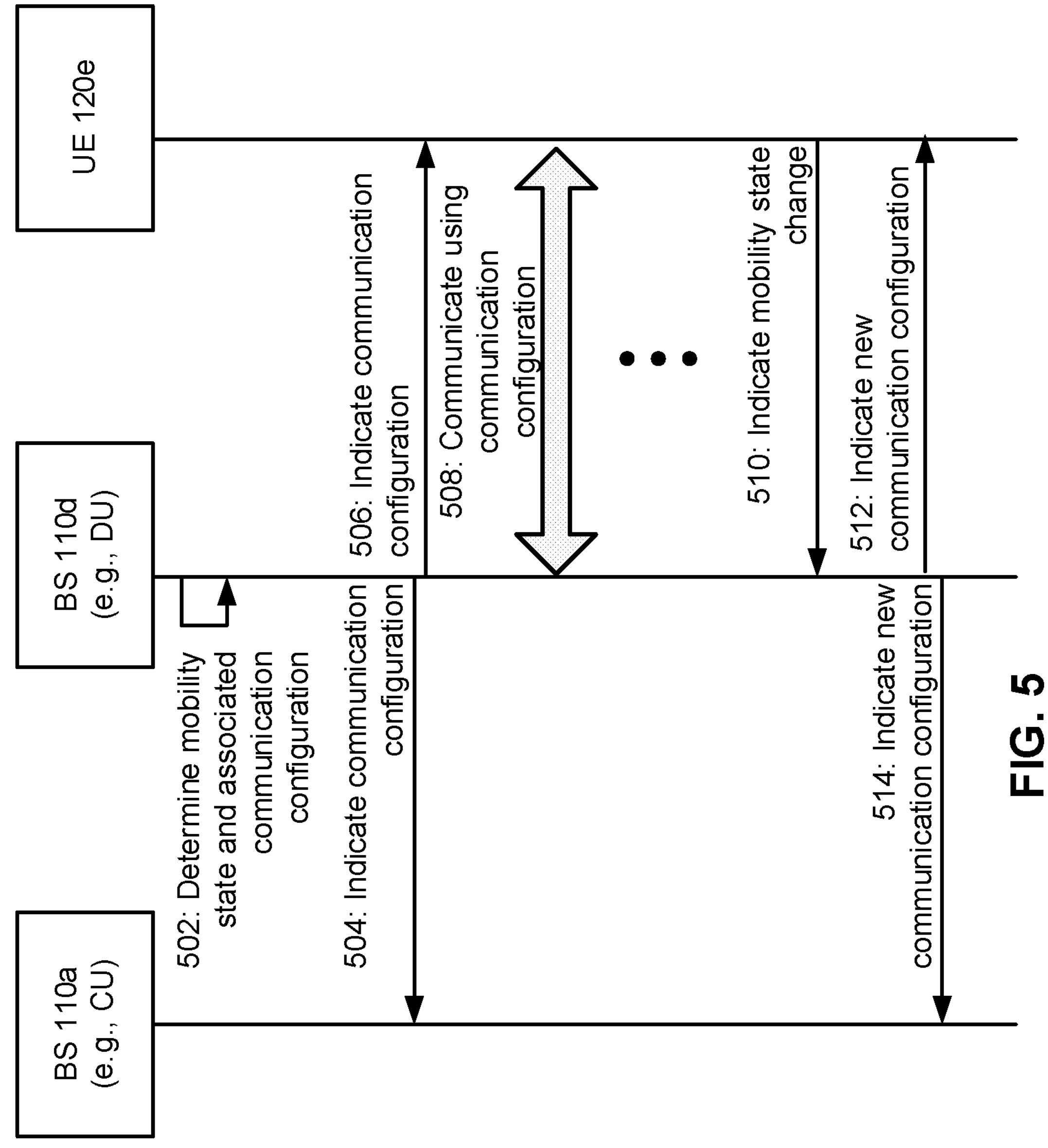

FIG. 5 is a diagram illustrating an example 500 of communication procedure configuration for mobile network nodes, in accordance with various aspects of the present disclosure. As shown in FIG. 5, example 500 includes a BS 110*a* (e.g., a CU), a BS 110*d* (e.g., a DU), and a UE 120*e*.

As shown in FIG. 5, and by reference number 502, BS 110*d* may determine a mobility state and an associated communication configuration. For example, BS 110*d* may select the communication configuration from a plurality of communication configurations corresponding to a plurality of mobility states. In this case, BS 110*d* determines the communication configuration autonomously (e.g., without receiving an explicit indication of the communication configuration from BS 110*a*). Additionally, or alternatively, BS 110*d* may receive information (e.g., from BS 110*a*) identifying the communication configuration.

In some aspects, BS 110*d* may determine the communication configuration based at least in part on a mobility state of BS 110*d*. For example, BS 110*d* may determine whether BS 110*d* is stationary, is moving at less than a threshold speed, is moving at greater than a threshold speed, and/or the like. In some aspects, BS 110*d* may determine the communication configuration based at least in part on a mobility state of UE 120*e*. For example, BS 110*d* may determine whether UE 120*e* is stationary, is moving at less than a threshold speed, is moving at greater than a threshold speed, and/or the like. In some aspects, BS 110*d* may determine the communication configuration based at least in part on respective mobility states of BS 110*d* and UE 120*e*.

In some aspects, BS 110*a* may determine the mobility state based at least in part on received signaling. For example, BS 110*d* may receive signaling from BS 110*a* and/or UE 120*e* indicating a mobility state of UE 120*e*. In some aspects, BS 110*a* may select a communication configuration for a particular communication procedure. For example, BS 110*a* may select the communication configuration for an initial access procedure, a cell reselection procedure, a neighbor-cell search procedure, a peer discovery procedure, or a measurement procedure.

As further shown in FIG. 5, and by reference numbers 504 and 506, BS 110*d* may indicate the communication configuration to BS 110*a* and/or UE 120*e*. For example, BS 110*d* may transmit a message to BS 110*a* (e.g., via an F1-AP interface or using radio resource control (RRC) signaling) indicating that BS 110*d* is to use a particular communication configuration to communicate with UE 120*e*. Additionally, or alternatively, BS 110*d* may transmit a message to UE 120*e* (e.g., via medium access control (MAC) control element (CE) signaling or RRC signaling) explicitly indicating the communication configuration for a communication procedure. Additionally, or alternatively, BS 110*d* may transmit an indication of a mobility state to UE 120*e* to enable UE 120*e* to select the communication configuration.

As further shown in FIG. 5, and by reference number 508, BS 110*d* and UE 120*e* may communicate using the communication configuration. For example, BS 110*d* and UE 120*e* may communicate in accordance with the communication configuration to perform an initial access procedure, a cell reselection procedure, a neighbor-cell search procedure, a peer discovery procedure, or a measurement procedure.

As further shown in FIG. 5, and by reference number 510, at a subsequent time, BS 110*d* may determine a mobility state change, for example, based at least in part on received signaling from UE 120*e*. For example, when UE 120*e* changes from a high mobility state to a stationary mobility state, UE 120*e* may indicate the stationary mobility state to BS 110*d* to trigger a change to the communication configuration. Additionally, or alternatively, when BS 110*d* changes mobility state from a current mobility state to a new mobility state, BS 110*d* may determine to change the communication configuration to correspond to the new mobility state.

As further shown in FIG. 5, and by reference numbers 512 and 514, BS 110*d* may indicate a new communication configuration to UE 120*e* and/or BS 110*a*, to enable subsequent communication procedures using the new communication configuration. In this case, BS 110*d* may explicitly indicate the new communication configuration or may indicate the new mobility state to enable UE 120*e* and/or BS 110*a* to determine the new communication configuration. In some aspects, BS 110*d* may transmit an indication of the new communication configuration in accordance with a particular time gap. For example, BS 110*d* may transmit an indication of the new communication configuration a particular quantity of slots before the new communication configuration is to be used. In this way, BS 110*d* accounts for a delay in, for example, UE 120*e* switching to the new communication configuration, thereby reducing a likelihood of lost communications during a switch to the new communication configuration.

As indicated above, FIG. 5 is provided as an example. Other examples may differ from what is described with respect to FIG. 5.

Figure 6:
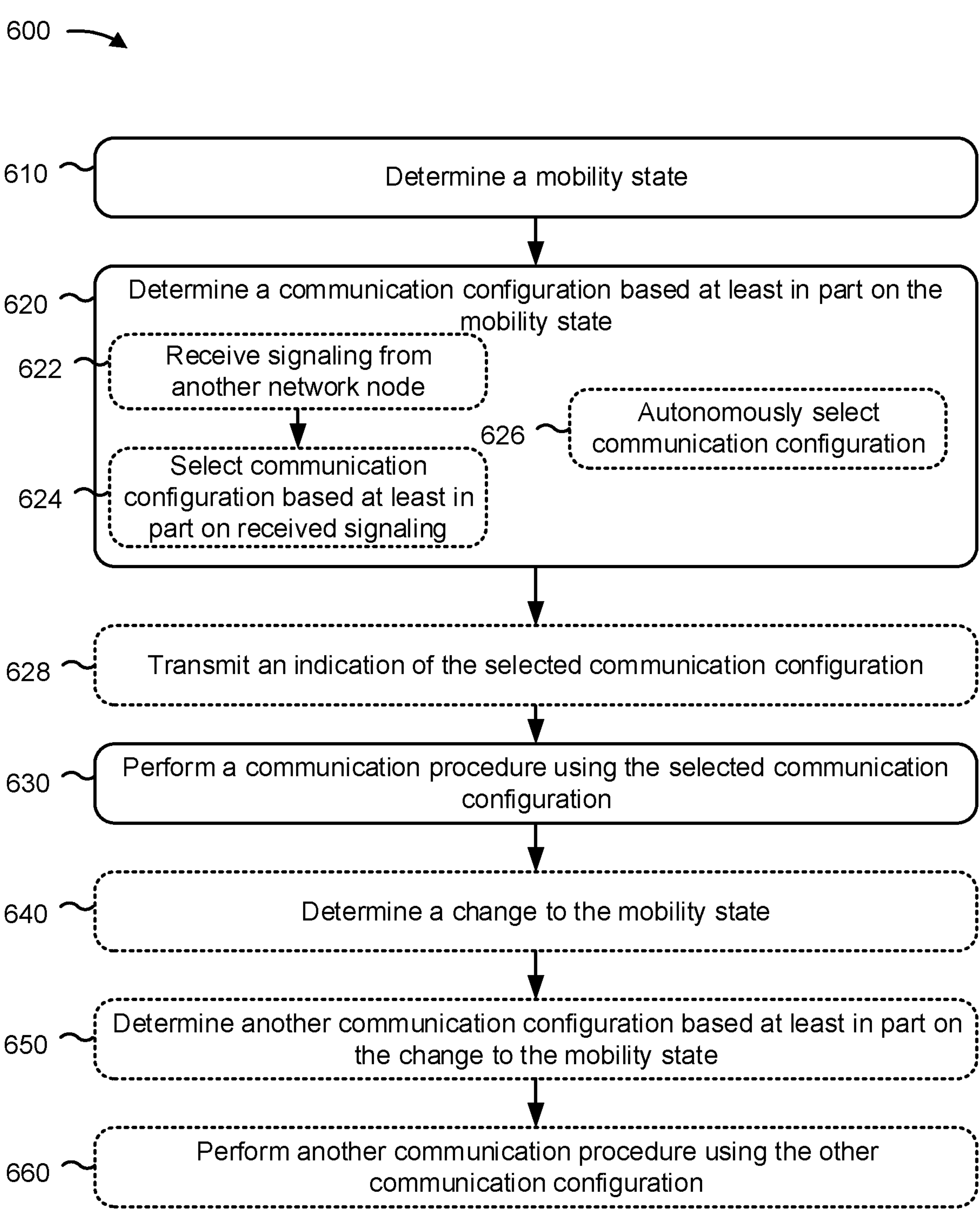
FIGS. 6 and 7 are diagrams illustrating example processes performed, for example, by a network node, in accordance with various aspects of the present disclosure.

FIG. 6 is a diagram illustrating an example process 600 performed, for example, by a network node, in accordance with various aspects of the present disclosure. Example process 600 is an example where a network node (e.g., BS 110*a*, BS 110*d*, UE 120*e*, the apparatus 1000, the apparatus 1100, the apparatus 1200, among other examples) performs operations associated with communication procedure configuration for mobile network nodes.

As shown in FIG. 6, in some aspects, process 600 may include determining a mobility state (block 610). For example, the network node (e.g., using controller/processor 240, controller/processor 280, and/or the like) may determine a mobility state, as described above.

As further shown in FIG. 6, in some aspects, process 600 may include determining a communication configuration based at least in part on the mobility state (block 620). For example, the network node (e.g., using controller/processor 240, controller/processor 280, and/or the like) may determine a communication configuration, selected from a plurality of communication configurations associated with a plurality of mobility states, based at least in part on the mobility state, as described above. In some aspects, process 600 may include receiving signaling from another network node (block 622) and selecting the communication configuration based at least in part on the received signaling (block 624). For example, the network node may receive the signaling (e.g., using receiver processor 258, receiver processor 238, among other examples), and may select the communication configuration (e.g., using controller/processor 240, controller/processor 280, among other examples). In some aspects, process 600 may include autonomously selecting the communication configuration (block 626). For example, the network node may autonomously select the communication configuration using controller/processor 240, controller/processor 280, among other examples).

As further shown in FIG. 6, in some aspects, process 600 may include performing a communication procedure using the selected communication configuration (block 630). For example, the network node (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may perform a communication procedure using the selected communication configuration, as described above.

As further shown in FIG. 6, in some aspects, process 600 may include transmitting an indication of the selected communication configuration (block 628). For example, after determining the communication configuration, the network node (e.g., using transmit processor 220, transmit processor 264, among other examples) may transmit information explicitly or implicitly identifying the communication configuration.

As further shown in FIG. 6, in some aspects, process 600 may include determining a change to the mobility state (block 640), determining another communication configuration based at least in part on the change to the mobility state (block 650), and performing another communication procedure using the other communication configuration (block 660). For example, after performing the communication procedure, the network node may detect the change (e.g., using controller/processor 240, controller/processor 280, among other examples), determine the change to the mobility state (e.g., using controller/processor 240, controller/processor 280, among other examples), and may perform another communication procedure (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, or MOD 254, among other examples).

Process 600 may include additional aspects, such as any single aspect or any combination of aspects described below and/or in connection with one or more other processes described elsewhere herein.

In a first aspect, the communication procedure is at least one of an initial access procedure, a cell reselection procedure, a neighbor-cell search procedure, a peer discovery procedure, or a measurement procedure.

In a second aspect, alone or in combination with the first aspect, the selected communication configuration is associated with at least one of a transmission parameter relating to a beam-sweep of at least one reference signal, a transmission parameter relating to transmission of system information, a random access channel occasion periodicity, a beam width, or a combination thereof.

In a third aspect, alone or in combination with one or more of the first and second aspects, the selected communication configuration is associated with a random access channel message window with a configuration of at least one random access channel opportunity and a configuration of at least one synchronization signal block.

In a fourth aspect, alone or in combination with one or more of the first through third aspects, process 600 includes detecting a change to the mobility state; determining another communication configuration based at least in part on the change to the mobility state; and performing another communication procedure using the other communication configuration.

In a fifth aspect, alone or in combination with one or more of the first through fourth aspects, the mobility state is for the network node or another network node in communication with the network node.

In a sixth aspect, alone or in combination with one or more of the first through fifth aspects, process 600 includes selecting the selected communication configuration based at least in part on signaling received from another network node.

In a seventh aspect, alone or in combination with one or more of the first through sixth aspects, process 600 includes autonomously selecting the selected communication configuration.

In an eighth aspect, alone or in combination with one or more of the first through seventh aspects, process 600 includes transmitting an indication of the selected communication configuration.

In a ninth aspect, alone or in combination with one or more of the first through eighth aspects, the indication is transmitted to at least one of: a control network node, a central unit, a parent network node, a child network node, a target network node, or a combination thereof.

In a tenth aspect, alone or in combination with one or more of the first through ninth aspects, the indication is transmitted before the communication procedure is performed.

In an eleventh aspect, alone or in combination with one or more of the first through tenth aspects, process 600 includes transmitting an indication of a mobility state change, and receiving information identifying the selected communication configuration based at least in part on transmitting the indication of the mobility state change.

In a twelfth aspect, alone or in combination with one or more of the first through eleventh aspects, the selected communication configuration is determined based at least in part on a stored configuration.

In a thirteenth aspect, alone or in combination with one or more of the first through twelfth aspects, the stored configuration identifies at least one of: a mapping between the mobility state and the selected communication configuration, a beam-sweeping periodicity for the mobility state, or a combination thereof.

In a fourteenth aspect, alone or in combination with one or more of the first through thirteenth aspects, process 600 includes providing an explicit indication of parameters of the selected communication configuration.

In a fifteenth aspect, alone or in combination with one or more of the first through fourteenth aspects, process 600 includes providing an explicit indication of a mobility state change to indicate that parameters of the selected communication configuration are to be used for the communication procedure.

In a fifteenth aspect, alone or in combination with one or more of the first through fourteenth aspects, the network node is an integrated access and backhauling (IAB) node.

In a sixteenth aspect, alone or in combination with one or more of the first through fifteenth aspects, the mobility state is an attribute of the IAB node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
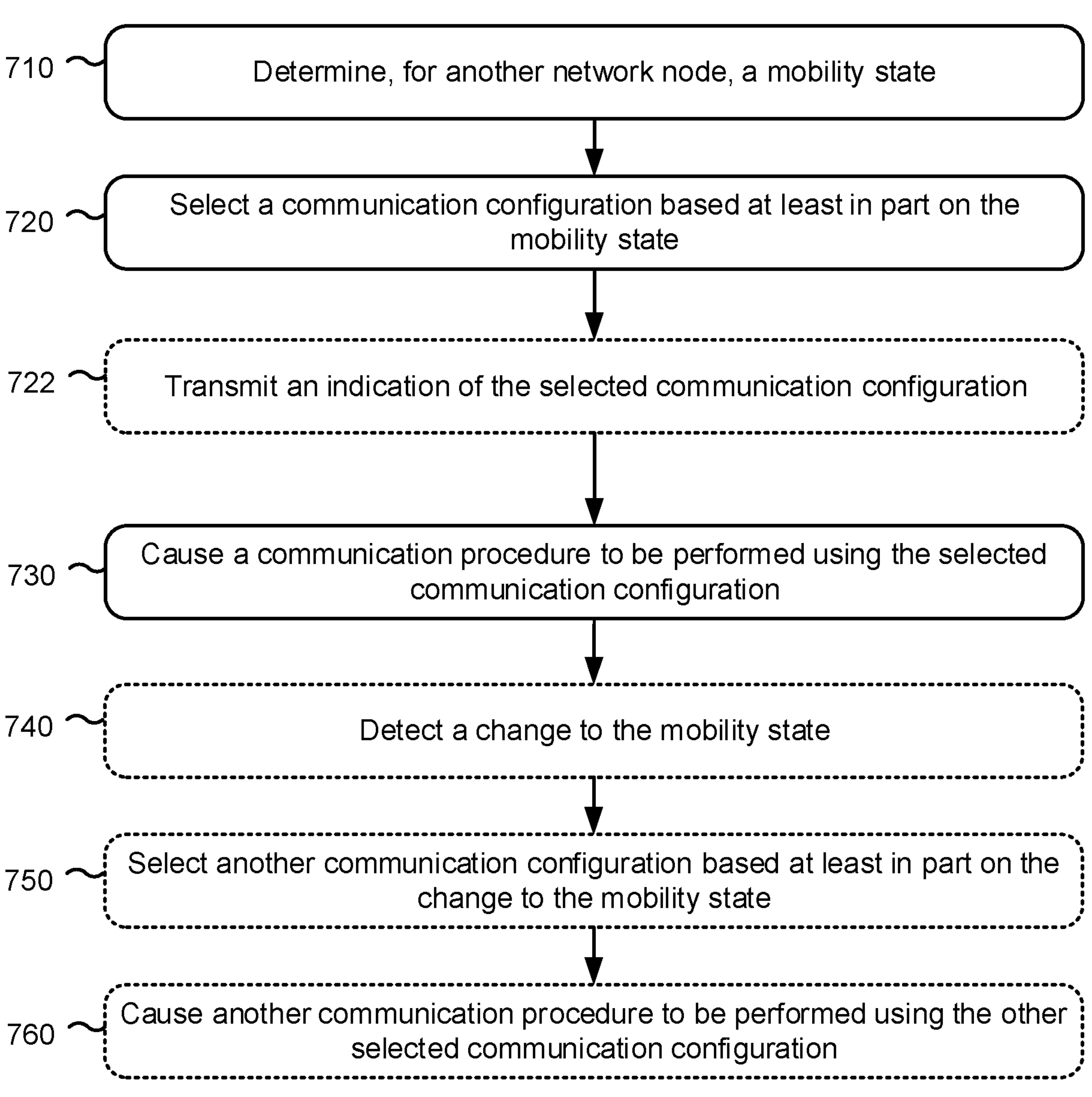

FIG. 7 is a diagram illustrating an example process 700 performed, for example, by a network node, in accordance with various aspects of the present disclosure. Example process 700 is an example where a network node (e.g., BS 110*a*, BS 110*d*, UE 120*e*, and/or the like) performs operations associated with communication procedure configuration for mobile network nodes.

As shown in FIG. 7, in some aspects, process 700 may include determining, for another network node, a mobility state (block 710). For example, the network node (e.g., using controller/processor 240, controller/processor 280, and/or the like) may determine, for another network node, a mobility state, as described above.

As further shown in FIG. 7, in some aspects, process 700 may include selecting a communication configuration based at least in part on the mobility state (block 720). For example, the network node (e.g., using controller/processor 240, controller/processor 280, and/or the like) may select a communication configuration from a plurality of communication configurations associated with a plurality of mobility states based at least in part on the mobility state, as described above.

As further shown in FIG. 7, in some aspects, process 700 may include causing a communication procedure to be performed using the selected communication configuration (block 730). For example, the network node (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may cause, based at least in part on selecting the communication configuration, a communication procedure to be performed using the selected communication configuration, as described above.

As further shown in FIG. 7, in some aspects, process 700 may include transmitting an indication of the selected communication configuration (block 728). For example, after determining the communication configuration, the network node (e.g., using transmit processor 220, transmit processor 264, among other examples) may transmit information explicitly or implicitly identifying the communication configuration.

As further shown in FIG. 7, in some aspects, process 700 may include determining a change to the mobility state (block 740), determining another communication configuration based at least in part on the change to the mobility state (block 750), and causing another communication procedure to be performed using the other communication configuration (block 760). For example, after performing the communication procedure, the network node may detect the change (e.g., using controller/processor 240, controller/processor 280, among other examples), determine the change to the mobility state (e.g., using controller/processor 240, controller/processor 280, among other examples), and may cause another communication procedure to be performed (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, or MOD 254, among other examples).

Process 700 may include additional aspects, such as any single aspect or any combination of aspects described below and/or in connection with one or more other processes described elsewhere herein.

In a first aspect, the communication procedure is at least one of an initial access procedure, a cell reselection procedure, a neighbor-cell search procedure, a peer discovery procedure, a measurement procedure, or a combination thereof.

In a second aspect, alone or in combination with the first aspect, the selected communication configuration is associated with at least one of a transmission parameter relating to a beam-sweep of at least one reference signal, a transmission parameter relating to transmission of system information, a random access channel occasion periodicity, a beam width, or a combination thereof.

In a third aspect, alone or in combination with one or more of the first and second aspects, the selected communication configuration is associated with a random access channel message window with a configuration of at least one random access channel opportunity and a configuration of at least one synchronization signal block.

In a fourth aspect, alone or in combination with one or more of the first through third aspects, process 700 includes detecting a change to the mobility state; determining another communication configuration based at least in part on the change to the mobility state; and performing another communication procedure using the other communication configuration.

In a fifth aspect, alone or in combination with one or more of the first through fourth aspects, process 700 includes transmitting an indication of the selected communication configuration to one or more other network nodes based at least in part on selecting the selected communication configuration.

In a sixth aspect, alone or in combination with one or more of the first through fifth aspects, the indication is transmitted before the communication procedure is performed.

In a seventh aspect, alone or in combination with one or more of the first through sixth aspects, process 700 includes receiving an indication of the mobility state, and transmitting information identifying the selected communication configuration based at least in part on receiving the indication of the mobility state.

In an eighth aspect, alone or in combination with one or more of the first through seventh aspects, process 700 includes providing an explicit indication of parameters of the selected communication configuration.

In a ninth aspect, alone or in combination with one or more of the first through eighth aspects, process 700 includes providing an explicit indication of the mobility state to indicate that parameters of the selected communication configuration are to be used for the communication procedure.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
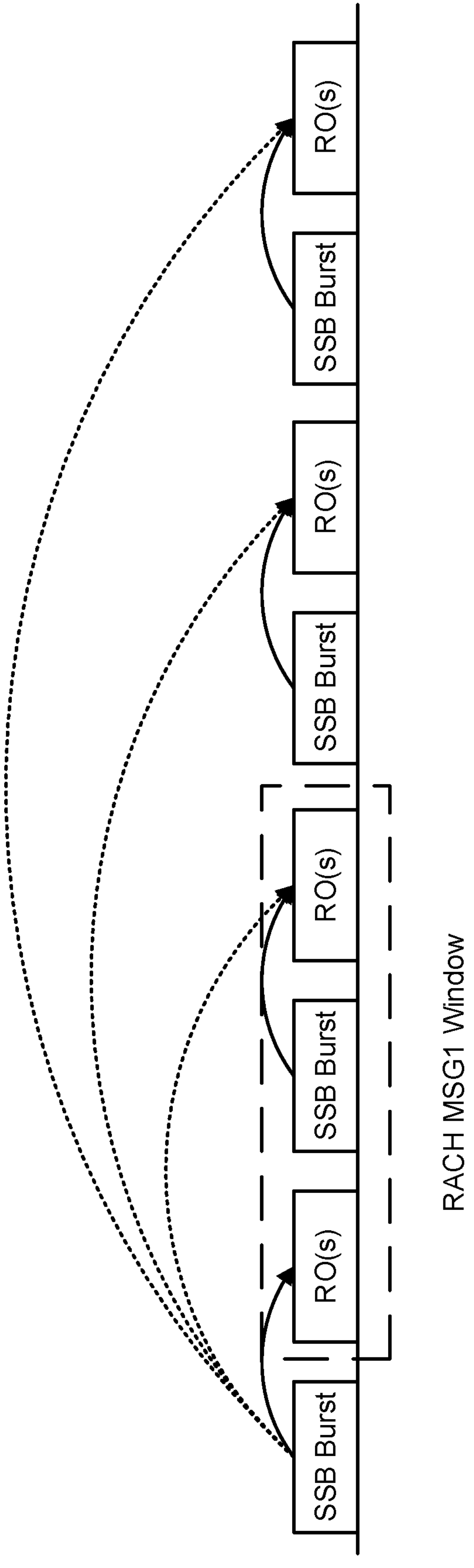
FIG. 8 is a diagram illustrating an example of a random access channel message window, in accordance with various aspects of the present disclosure.

FIG. 8 is a diagram illustrating an example 800 associated with a random access channel (RACH) message window, in accordance with various aspects of the present disclosure.

As shown in FIG. 8, a set of synchronization signal block (SSB) burst sets and a set of associated RACH occasions (ROs) may be associated with the same periodicity. In this case, each SSB, in an SSB burst set (which may be termed an SSB burst), may have one or more associated ROs in a set of ROs and the one or more associated ROs may repeat periodically. When a network node (e.g., a UE 120, a BS 110, and/or the like) detects an SSB in, for example, a first SSB burst, the network node may be capable of using any associated RO (e.g., a next associated RO, a repetition of the associated RO that occurs later, and/or the like). As a result, the network node may send a RACH message as a response to the first SSB burst during any one of a plurality of future ROs. Some aspects described herein may define a RACH window (e.g., a RACH message type-1 (MSG1) window). For example, a network node may determine a threshold period of time for transmitting an MSG1. In this case, rather than using any of the associated ROs, the network node may transmit the MSG1 during associated ROs that occur within the RACH MSG1 window. In this way, when the network node is, for example, traveling at a threshold speed which may cause a beam change within a relatively short period of time (e.g., within several hundred milliseconds), the network node may ensure that a beam association remains valid by transmitting within the RACH window.

As indicated above, FIG. 8 is provided as an example. Other examples may differ from what is described with respect to FIG. 8.

Figure 9:
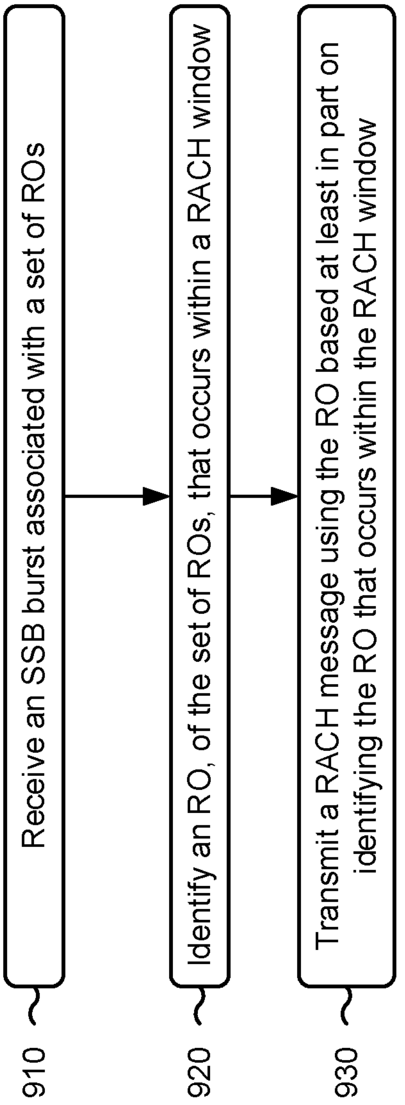
FIG. 9 is an example process performed, for example, by a network node, in accordance with various aspects of the present disclosure.

FIG. 9 is a diagram illustrating an example process 900 performed, for example, by a network node, in accordance with various aspects of the present disclosure. Example process 900 is an example where the network node (e.g., BS 110*a*, BS 110*d*, UE 120*e*, and/or the like) performs operations associated with communication procedure configuration for mobile network nodes.

As shown in FIG. 9, in some aspects, process 900 may include receiving an SSB burst associated with a set of ROs (block 910). For example, the network node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive a SSB burst associated with a set of ROs, as described above.

As further shown in FIG. 9, in some aspects, process 900 may include identifying an RO, of the set of ROs, that occurs within a RACH window (block 920). For example, the network node (e.g., using controller/processor 240, controller/processor 280, and/or the like) may identify an RO, of the set of ROs, that occurs within a RACH window, as described above.

As further shown in FIG. 9, in some aspects, process 900 may include transmitting a RACH message using the RO based at least in part on identifying the RO that occurs within the RACH window (block 930). For example, the network node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit a RACH message using the RO based at least in part on identifying the RO that occurs within the RACH window, as described above.

Process 900 may include additional aspects, such as any single aspect or any combination of aspects described below and/or in connection with one or more other processes described elsewhere herein.

In a first aspect, the RACH message is a RACH MSG1.

In a second aspect, alone or in combination with the first aspect, each RO associated with the SSB burst is defined to occur within the RACH window.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
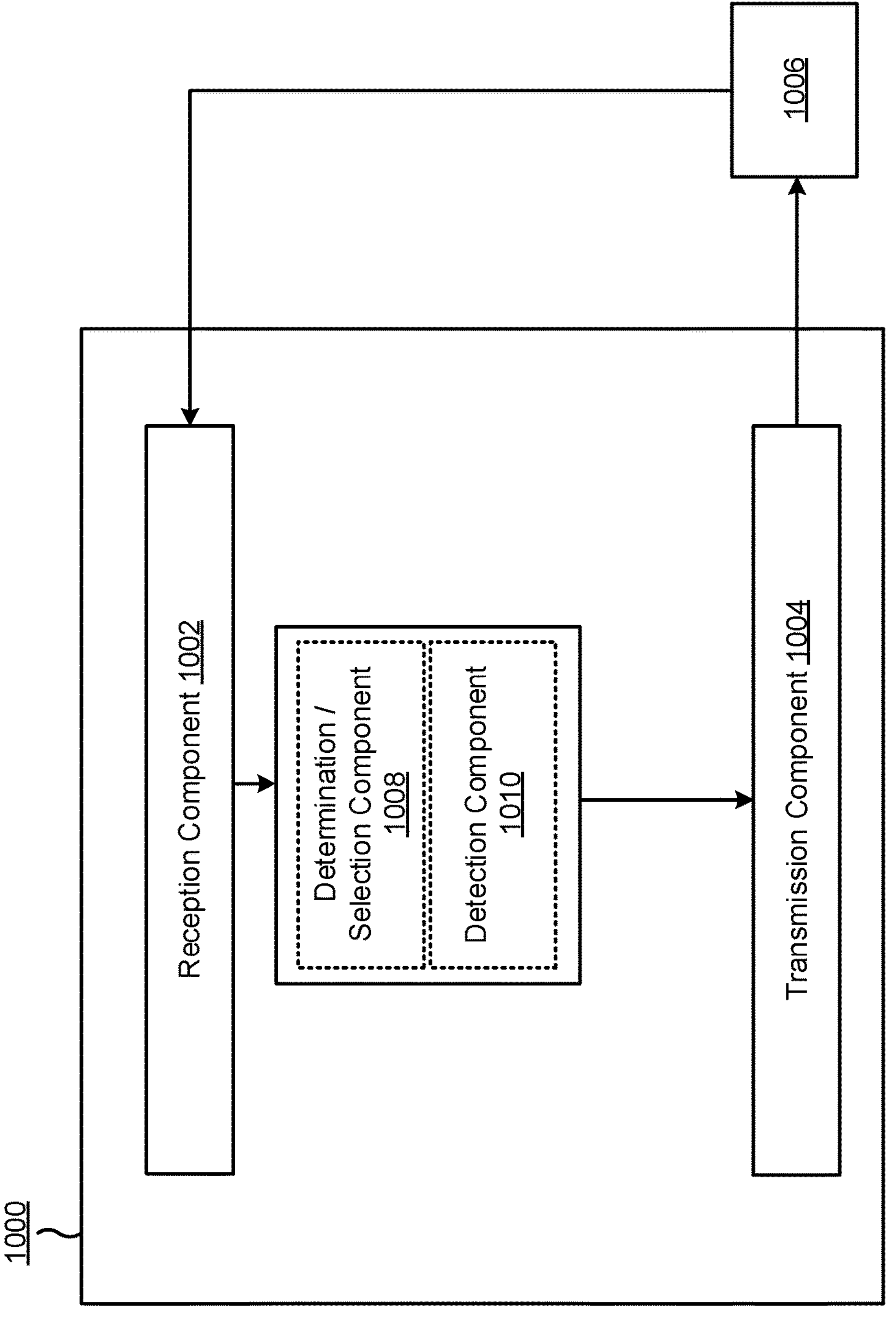
FIGS. 10-12 are examples of an apparatus for wireless communication, in accordance with various aspects of the present disclosure.

FIG. 10 is a block diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE (e.g., UE 120*e*, among other examples), a base station (e.g., BS 110*a*, BS 110*d*, among other examples), or another wireless communication device) using the reception component 1002 and the transmission component 1004. As further shown, the apparatus 1000 may include one or more of a determination/selection component 1008 or a detection component 1010, among other examples.

In some aspects, the apparatus 1000 may be configured to perform one or more operations described herein in connection with FIGS. 4, 5, and/or 8. Additionally or alternatively, the apparatus 1000 may be configured to perform one or more processes described herein, such as process 600 of FIG. 6, process 700 of FIG. 7, process 900 of FIG. 9, or a combination thereof. In some aspects, the apparatus 1000 and/or one or more components shown in FIG. 10 may include one or more components of the network node described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the network node described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the network node described above in connection with FIG. 2. In some aspects, the transmission component 1004 may be collocated with the reception component 1002 in a transceiver.

The determination/selection component 1008 may determine a mobility state. The determination/selection component 1008 may determine a communication configuration, selected from a plurality of communication configurations associated with a plurality of mobility states, based at least in part on the mobility state. The reception component 1002 and/or transmission component 1004 may perform a communication procedure using the selected communication configuration. The determination/selection component 1008 may identify an RO that occurs within a RACH window.

The determination/selection component 1008 may determine, for another network node, a mobility state. The determination/selection component 1008 may select a communication configuration from a plurality of communication configurations associated with a plurality of mobility states based at least in part on the mobility state. The reception component 1002 and/or transmission component 1004 may cause, based at least in part on selecting the communication configuration, a communication procedure to be performed using the selected communication configuration.

The reception component 1002 may receive a synchronization signal block (SSB) burst associated with a set of random access channel (RACH) occasions (ROs). The determination/selection component 1008 may identify an RO, of the set of ROs, that occurs within a RACH window. The transmission component 1004 may transmit a RACH message using the RO based at least in part on identifying the RO that occurs within the RACH window. The detection component 1110 may detect a change to a mobility state.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
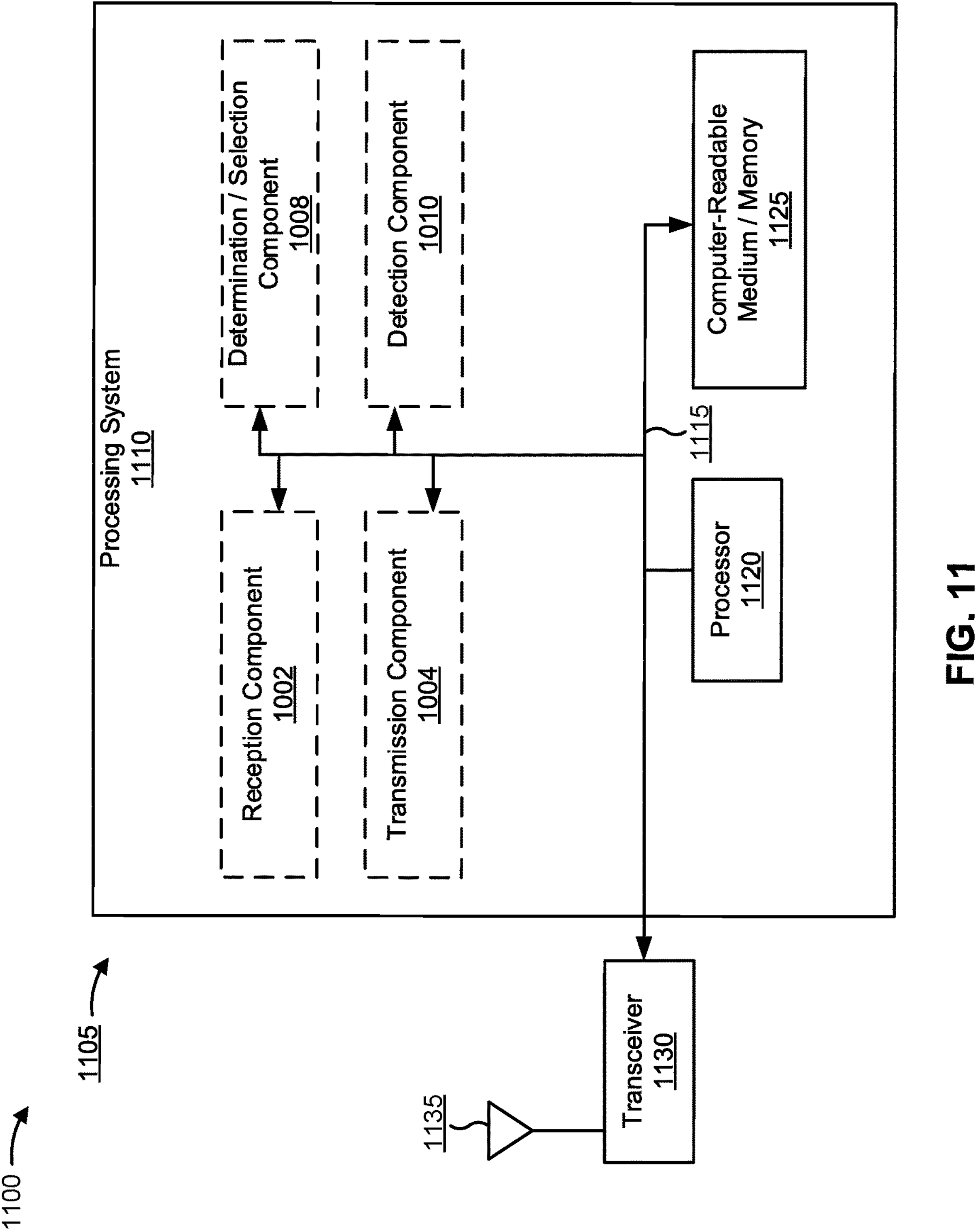

FIG. 11 is a diagram illustrating an example 1100 of a hardware implementation for an apparatus 1105 employing a processing system 1110. The apparatus 1105 may be a network node.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, power management circuits, and/or the like.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1004, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer readable medium/memory 1125, one or more hardware modules coupled to the processor 1120, or some combination thereof.

In some aspects, the processing system 1110 may be a component of the base station 110 (e.g., BS 110*a*, BS 110*d*, among other examples) and may include the memory 242 and/or at least one of the TX MIMO processor 230, the RX processor 238, and/or the controller/processor 240. In some aspects, the processing system 1110 may be a component of UE 120 (e.g., UE 120*e* among other examples) and may include controller/processor 280, TX processor 264, TX MIMO processor 266, and/or RX processor 258. In some aspects, the apparatus 1105 for wireless communication includes means for determining a mobility state, means for determining a communication configuration, means for performing a communication procedure, means for detecting a change to the mobility state, means for transmitting an indication of a selected communication configuration, means for transmitting an indication of a mobility state change, means for receiving information identifying a selected communication configuration, or means for causing a communication procedure to be performed, among other examples. In some aspects, the apparatus 1105 may include means for receiving an SSB burst associated with a set of ROs; means for identifying an RO that occurs within a RACH window, or means for transmitting a RACH message using the RO, among other examples. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 11 is provided as an example. Other examples may differ from what is described in connection with FIG. 11.

Figure 12:
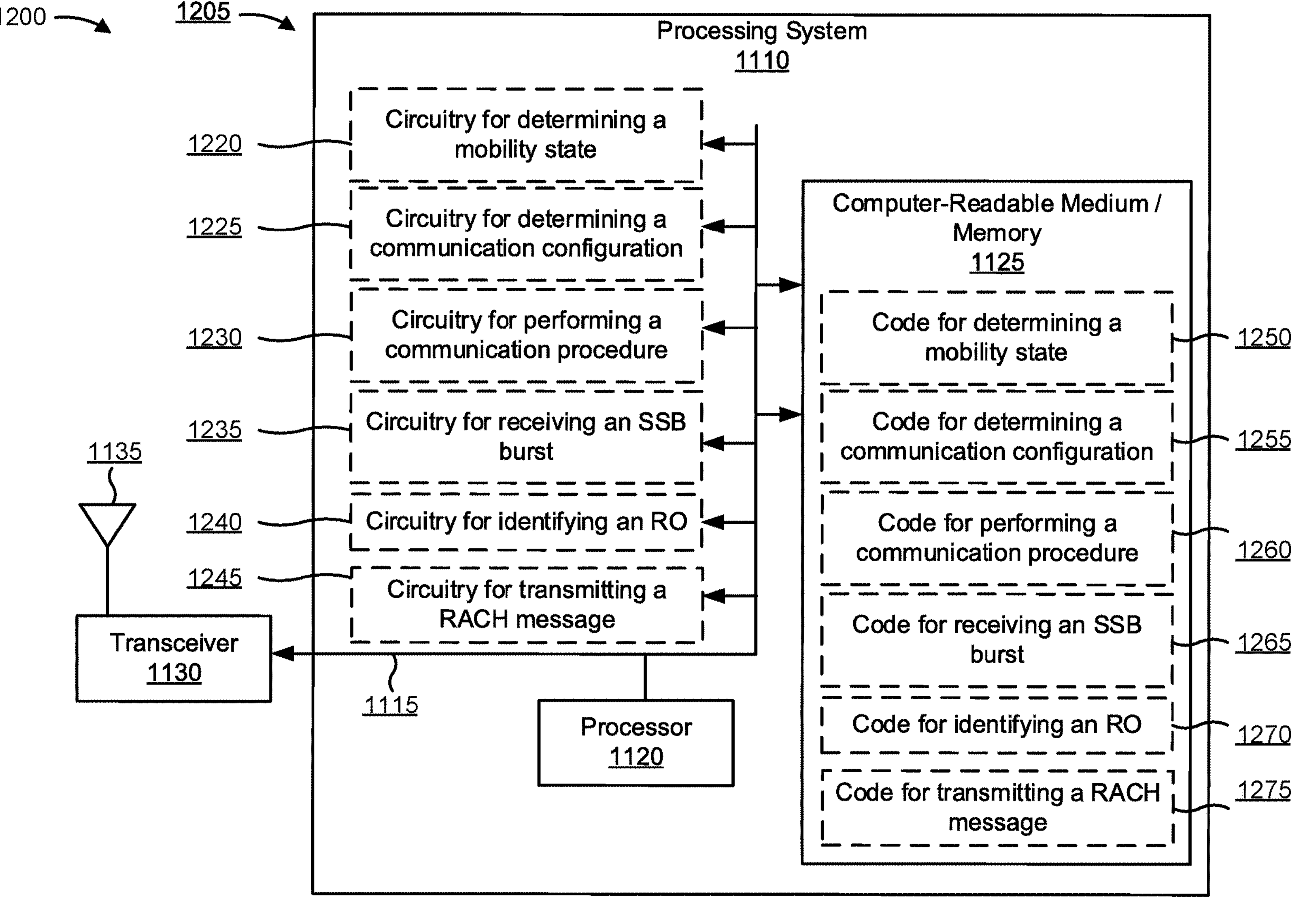

FIG. 12 is a diagram illustrating an example 1200 of an implementation of code and circuitry for an apparatus 1205. The apparatus 1205 may be a network node.

As further shown in FIG. 12, the apparatus may include circuitry for determining a mobility state (circuitry 1220). For example, the apparatus may include circuitry to enable the apparatus to determine a mobility state, another mobility state (e.g., after determining the mobility state), and/or the like.

As further shown in FIG. 12, the apparatus may include circuitry for determining a communication configuration (circuitry 1225). For example, the apparatus may include circuitry to enable the apparatus to determine a communication configuration, selected from a plurality of communication configurations associated with a plurality of mobility states, based at least in part on the mobility state.

As further shown in FIG. 12, the apparatus may include circuitry for performing a communication procedure (circuitry 1230). For example, the apparatus may include circuitry to enable the apparatus to perform a communication procedure using the selected communication configuration.

As further shown in FIG. 12, the apparatus may include circuitry for receiving an SSB burst (circuitry 1235). For example, the apparatus may include circuitry to enable the apparatus to receive an SSB burst associated with a set of ROs.

As further shown in FIG. 12, the apparatus may include circuitry for identifying an RO (circuitry 1240). For example, the apparatus may include circuitry to enable the apparatus to identify an RO, of the set of ROs, that occurs within a RACH window.

As further shown in FIG. 12, the apparatus may include circuitry for transmitting a RACH message (circuitry 1245). For example, the apparatus may include circuitry to enable the apparatus to transmit a RACH message using the RO based at least in part on identifying the RO that occurs within the RACH window.

As further shown in FIG. 12, the apparatus may include, stored in computer-readable medium 1125, code for determining a mobility state (code 1250). For example, the apparatus may include code that, when executed by the processor 1120, may cause the processor 1120 to determine the mobility state.

As further shown in FIG. 12, the apparatus may include, stored in computer-readable medium 1125, code for determining a communication configuration (code 1255). For example, the apparatus may include code that, when executed by the processor 1120, may cause the processor 1120 to determine a communication configuration, selected from a plurality of communication configurations associated with a plurality of mobility states, based at least in part on the mobility state.

As further shown in FIG. 12, the apparatus may include, stored in computer-readable medium 1125, code for performing a communication procedure (code 1260). For example, the apparatus may include code that, when executed by the processor 1120, may cause the processor 1120 to cause the transceiver 1130 to perform a communication procedure using the selected communication configuration.

As further shown in FIG. 12, the apparatus may include, stored in computer-readable medium 1125, code for receiving an SSB burst (code 1265). For example, the apparatus may include code that, when executed by the processor 1120, may cause the processor 1120 to cause the transceiver 1130 to receive an SSB burst associated with a set of ROs.

As further shown in FIG. 12, the apparatus may include, stored in computer-readable medium 1125, code for identifying an RO (code 1270). For example, the apparatus may include code that, when executed by the processor 1120, may cause the processor 1120 to identify an RO, of the set of ROs, that occurs within a RACH window.

As further shown in FIG. 12, the apparatus may include, stored in computer-readable medium 1125, code for transmitting a RACH message (code 1275). For example, the apparatus may include code that, when executed by the processor 1120, may cause the processor 1120 to cause transceiver 1130 to transmit a RACH message using the RO based at least in part on identifying the RO that occurs within the RACH window.

FIG. 12 is provided as an example. Other examples may differ from what is described in connection with FIG. 12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed at a network node, comprising:

determining a mobility state;

determining a communication configuration based at least in part on the mobility state, wherein the communication configuration corresponds to one or more of:

a periodicity of transmission of one or more of beam-sweeping reference signals or system information, based at least in part on the mobility state, a periodicity of random access channel (RACH) occasions, based at least in part on the mobility state, or a particular RACH message window where one or more RACH occasions are within a threshold time separation associated with one or more synchronization signal blocks, based at least in part on the mobility state; and performing a communication procedure using the communication configuration.

2. The method of claim 1, wherein the communication procedure is at least one of: an initial access procedure, a cell reselection procedure, a neighbor-cell search procedure, a peer discovery procedure, or a measurement procedure.

3. The method of claim 1, wherein the network node is an integrated access and backhauling (IAB) node.

4. The method of claim 3, wherein the mobility state is an attribute of the IAB node.

5. The method of claim 1, wherein the communication configuration is associated with a beam width.

6. The method of claim 1,
wherein the communication configuration corresponds to the particular RACH message window, and
wherein the particular RACH message window is configured with at least one RACH opportunity.

7. The method of claim 1, further comprising:
detecting a change to the mobility state;
determining another communication configuration based at least in part on the change to the mobility state; and
performing another communication procedure using the other communication configuration.

8. The method of claim 1, wherein the mobility state is for the network node or another network node in communication with the network node.

9. The method of claim 1, wherein determining the communication configuration comprises:
selecting the communication configuration based at least in part on signaling received from another network node.

10. The method of claim 1, wherein determining the communication configuration comprises:
autonomously selecting the communication configuration.

11. The method of claim 1, further comprising:
transmitting an indication of the communication configuration.

12. The method of claim 11, wherein the indication is transmitted to at least one of: a control network node, a central unit, a parent network node, a child network node, a target network node, or a combination thereof.

13. The method of claim 11, wherein the indication is transmitted before the communication procedure is performed.

14. The method of claim 1, further comprising:
receiving an indication of a mobility state change; and
transmitting information identifying the communication configuration based at least in part on receiving the indication of the mobility state change.

15. The method of claim 1, wherein the communication configuration is determined further based at least in part on a stored configuration.

16. The method of claim 15, wherein the stored configuration identifies at least a mapping between the mobility state and the communication configuration.

17. The method of claim 1, further comprising:
providing an explicit indication of parameters of the communication configuration.

18. The method of claim 1, further comprising:
providing an explicit indication of a mobility state change to indicate that parameters of the communication configuration are to be used for the communication procedure.

19. The method of claim 1, wherein the network node is a base station.

20. The method of claim 19, wherein the base station is a central unit.

21. A method of wireless communication performed at a network node, comprising:
determining, for another network node, a mobility state;
selecting a communication configuration based at least in part on the mobility state; and
causing a communication procedure to be performed using the communication configuration, wherein the communication configuration corresponds to one or more of:
a periodicity of transmission of one or more of beam-sweeping reference signals or system information, based at least in part on the mobility state,
a periodicity of random access channel (RACH) occasions, based at least in part on the mobility state, or
a particular RACH message window where one or more RACH occasions are within a threshold time separation associated with one or more synchronization signal blocks, based at least in part on the mobility state.

22. The method of claim 21, wherein the communication procedure is at least one of: an initial access procedure, a cell reselection procedure, a neighbor-cell search procedure, a peer discovery procedure, or a measurement procedure.

23. The method of claim 21, wherein the communication configuration is associated with a beam width.

24. The method of claim 21,
wherein the communication configuration corresponds to the particular RACH message window, and
wherein the particular RACH message window is configured with at least one RACH opportunity.

25. The method of claim 21, further comprising:
detecting a change to the mobility state;
determining another communication configuration based at least in part on the change to the mobility state; and
causing another communication procedure to be performed using the other communication configuration.

26. The method of claim 21, further comprising:
transmitting an indication of the communication configuration to one or more other network nodes based at least in part on selecting the communication configuration.

27. The method of claim 26, wherein the indication is transmitted before the communication procedure is performed.

28. The method of claim 21, further comprising:
receiving an indication of the mobility state; and
transmitting information identifying the communication configuration based at least in part on receiving the indication of the mobility state.

29. The method of claim 21, wherein the network node is a base station.

30. The method of claim 29, wherein the base station is a distributed unit.

31. An apparatus for wireless communication at a network node, the apparatus comprising:
one or more memories; and
one or more processors coupled to the one or more memories, the one or more processors configured to cause the network node to:
determine a mobility state;
determine a communication configuration based at least in part on the mobility state, wherein the communication configuration corresponds to one or more of:
a periodicity of transmission of one or more of beam-sweeping reference signals or system information, based at least in part on the mobility state, a periodicity of random access channel (RACH) occasions, based at least in part on the mobility state, or a particular RACH message window where one or more RACH occasions are within a threshold time separation associated with one or more synchronization signal blocks, based at least in part on the mobility state; and perform a communication procedure using the communication configuration.

32. The apparatus of claim 31, wherein the network node is an integrated access and backhauling (IAB) node.

33. The apparatus of claim 32, wherein the mobility state is an attribute of the IAB node.

34. The apparatus of claim 31, wherein the network node is a base station.

35. The apparatus of claim 34, wherein the base station is a central unit.

36. An apparatus for wireless communication at a network node, the apparatus comprising:

one or more memories; and one or more processors coupled to the one or more memories, the one or more processors configured to cause the network node to:

determine, for another network node, a mobility state;

select a communication configuration based at least in part on the mobility state; and cause a communication procedure to be performed using the communication configuration, wherein the communication configuration corresponds to one or more of:

a periodicity of transmission of one or more of beam-sweeping reference signals or system information, based at least in part on the mobility state, a periodicity of random access channel (RACH) occasions, based at least in part on the mobility state, or a particular RACH message window where one or more RACH occasions are within a threshold time separation associated with one or more synchronization signal blocks, based at least in part on the mobility state.

37. The apparatus of claim 36, wherein the communication procedure is at least one of: an initial access procedure, a cell reselection procedure, a neighbor-cell search procedure, a peer discovery procedure, or a measurement procedure.

38. The apparatus of claim 36, wherein the network node is a base station.

39. The apparatus of claim 38, wherein the base station is a distributed unit.

40. A non-transitory computer-readable medium storing one or more instructions for wireless communication, the one or more instructions comprising:

one or more instructions that, when executed by a network node, cause the network node to:

determine a mobility state;

determine a communication configuration based at least in part on the mobility state, wherein the communication configuration corresponds to one or more of:

a periodicity of transmission of one or more of beam-sweeping reference signals or system information, based at least in part on the mobility state, a periodicity of random access channel (RACH) occasions, based at least in part on the mobility state, or a particular RACH message window where one or more RACH occasions are within a threshold time separation associated with one or more synchronization signal blocks, based at least in part on the mobility state; and perform a communication procedure using the communication configuration.

41. The non-transitory computer-readable medium of claim 40, wherein the network node is an integrated access and backhauling (IAB) node.

42. The non-transitory computer-readable medium of claim 41, wherein the mobility state is an attribute of the IAB node.

43. The non-transitory computer-readable medium of claim 40, wherein the network node is a base station.

44. The non-transitory computer-readable medium of claim 43, wherein the base station is a central unit.

45. A non-transitory computer-readable medium storing one or more instructions for wireless communication, the one or more instructions comprising:

one or more instructions that, when executed by a network node, cause the network node to:

determine, for another network node, a mobility state;

select a communication configuration based at least in part on the mobility state; and cause a communication procedure to be performed using the communication configuration, wherein the communication configuration corresponds to one or more of:

a periodicity of transmission of one or more of beam-sweeping reference signals or system information, based at least in part on the mobility state, a periodicity of random access channel (RACH) occasions, based at least in part on the mobility state, or a particular RACH message window where one or more RACH occasions are within a threshold time separation associated with one or more synchronization signal blocks, based at least in part on the mobility state.

46. The non-transitory computer-readable medium of claim 45, wherein the communication procedure is at least one of: an initial access procedure, a cell reselection procedure, a neighbor-cell search procedure, a peer discovery procedure, or a measurement procedure.

47. The non-transitory computer-readable medium of claim 45, wherein the network node is a base station.

48. The non-transitory computer-readable medium of claim 47, wherein the base station is a distributed unit.

* * * * *